(12) United States Patent  
Suzuki et al.

(10) Patent No.: US 12,326,610 B2  
(45) Date of Patent: Jun. 10, 2025

(54) IMAGING OPTICAL SYSTEM, IMAGE CAPTURE DEVICE, AND CAMERA SYSTEM

(71) Applicant: Panasonic Intellectual Property Management Co., Ltd., Osaka (JP)

(72) Inventors: Yasuto Suzuki, Osaka (JP); Yoshiaki Kurioka, Osaka (JP); Shunichiro Yoshinaga, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 573 days.

(21) Appl. No.: 17/750,878

(22) Filed: May 23, 2022

(65) Prior Publication Data

US 2022/0382010 A1 Dec. 1, 2022

(30) Foreign Application Priority Data

May 28, 2021 (JP) .................. 2021-089674  
Mar. 24, 2022 (JP) .................. 2022-048824

(51) Int. Cl.
*G02B 7/04* (2021.01)  
*G02B 9/64* (2006.01)  
*G03B 3/10* (2021.01)

(52) U.S. Cl.
CPC .................. *G02B 7/04* (2013.01); *G02B 9/64* (2013.01); *G03B 3/10* (2013.01)

(58) Field of Classification Search
None  
See application file for complete search history.

(56) References Cited

U.S. PATENT DOCUMENTS

2017/0351051 A1* 12/2017 Kawamura .............. G02B 9/64  
2018/0067281 A1 3/2018 Ichikawa et al.

FOREIGN PATENT DOCUMENTS

WO 2016/194111 12/2016

* cited by examiner

*Primary Examiner* — Phu Vu  
(74) *Attorney, Agent, or Firm* — Wenderoth, Lind & Ponack L.L.P.

(57) ABSTRACT

An imaging optical system includes a first lens group having positive power, a second lens group, and a third lens group. The first lens group includes a sub-lens group G1A, an aperture stop, and a sub-lens group G1B. The sub-lens group G1A includes a lens L1A1 and a lens L1A2. An object-side surface of the lens L1A1 is convex toward an object. The third lens group includes a lens L3E having negative power and a lens L3P located adjacent to, and closer to the object than, the lens L3E.

20 Claims, 12 Drawing Sheets

IMAGING OPTICAL SYSTEM, IMAGE CAPTURE DEVICE, AND CAMERA SYSTEM

CROSS-REFERENCE TO RELATED APPLICATIONS

The present application is based upon, and claims the benefit of priority to, Japanese Patent Application No. 2021-089674, filed on May 28, 2021, and Japanese Patent Application No. 2022-048824, filed on Mar. 24, 2022, the entire contents of which are hereby incorporated by reference.

TECHNICAL FIELD

The present disclosure generally relates to an imaging optical system, an image capture device, and a camera system. More particularly, the present disclosure relates to an imaging optical system with the ability to compensate for various types of aberrations sufficiently, and also relates to an image capture device and camera system including such an imaging optical system.

BACKGROUND ART

WO 2016/194111 A1 discloses an imaging optical system including a first lens group having positive power, a second lens group which moves during focusing, and a third lens group. The first, second, and third lens groups are arranged in this order such that the first lens group is located closer to an object than the second or third lens group and that the third lens group is located closer to an image than the first or second lens group.

SUMMARY

The present disclosure provides an imaging optical system with the ability to compensate for various types of aberrations sufficiently, and an image capture device and camera system including such an imaging optical system.

An imaging optical system according to an aspect of the present disclosure includes: a first lens group having positive power; a second lens group having power; and a third lens group having power. The first, second, and third lens groups are arranged in this order such that the first lens group is located closer to an object than any other lens group of the imaging optical system is. The first lens group and the third lens group do not move along an optical axis of the imaging optical system while the imaging optical system is focusing. The second lens group includes at least one lens LFN having negative power. The at least one lens LFN moves along the optical axis such that a first interval and a second interval change while the imaging optical system is focusing. The first interval is an interval on the optical axis between a surface, located closest to an image, of the first lens group and a surface, located closest to the object, of the second lens group. The second interval is an interval on the optical axis between a surface, located closest to the image, of the second lens group and a surface, located closest to the object, of the third lens group.

The first lens group includes a sub-lens group G1A, an aperture stop, and a sub-lens group G1B. The sub-lens group G1A, the aperture stop, and the sub-lens group G1B are arranged in this order such that the sub-lens group G1A is located closer to the object than any other component of the first lens group is.

The sub-lens group G1A includes a lens L1A1 and a lens L1A2 located adjacent to, and closer to the image than, the lens L1A1. The lens L1A1 and the lens L1A2 are arranged in this order such that the lens L1A1 is located closer to the object than any other component, including the lens L1A2, of the sub-lens group G1A is.

An object-side surface of the lens L1A1 is convex toward the object.

The third lens group includes a lens L3E having negative power, and a lens L3P located adjacent to, and closer to the object than, the lens L3E. The lens L3E and the lens L3P are arranged in this order such that the lens L3E is located closer to the image than any other component, including the lens L3P, of the third lens group is.

A camera system according to another aspect of the present disclosure includes: an interchangeable lens unit including the imaging optical system described above; and a camera body including an image sensor to receive an optical image formed by the imaging optical system and transform the optical image into an electrical image signal and a camera mount. The camera body is to be connected removably to the interchangeable lens unit via the camera mount. The interchangeable lens unit forms the optical image of the object on the image sensor.

An image capture device according to still another aspect of the present disclosure transforms an optical image of an object into an electrical image signal and displays and/or stores the electrical image signal thus transformed. The image capture device includes the imaging optical system described above and an image sensor. The imaging optical system forms the optical image of the object. The image sensor transforms the optical image formed by the imaging optical system into the electrical image signal.

BRIEF DESCRIPTION OF DRAWINGS

The figures depict one or more implementations in accordance with the present teaching, by way of example only, not by way of limitations. In the figures, like reference numerals refer to the same or similar elements.

DESCRIPTION OF EMBODIMENTS

Figure 1:
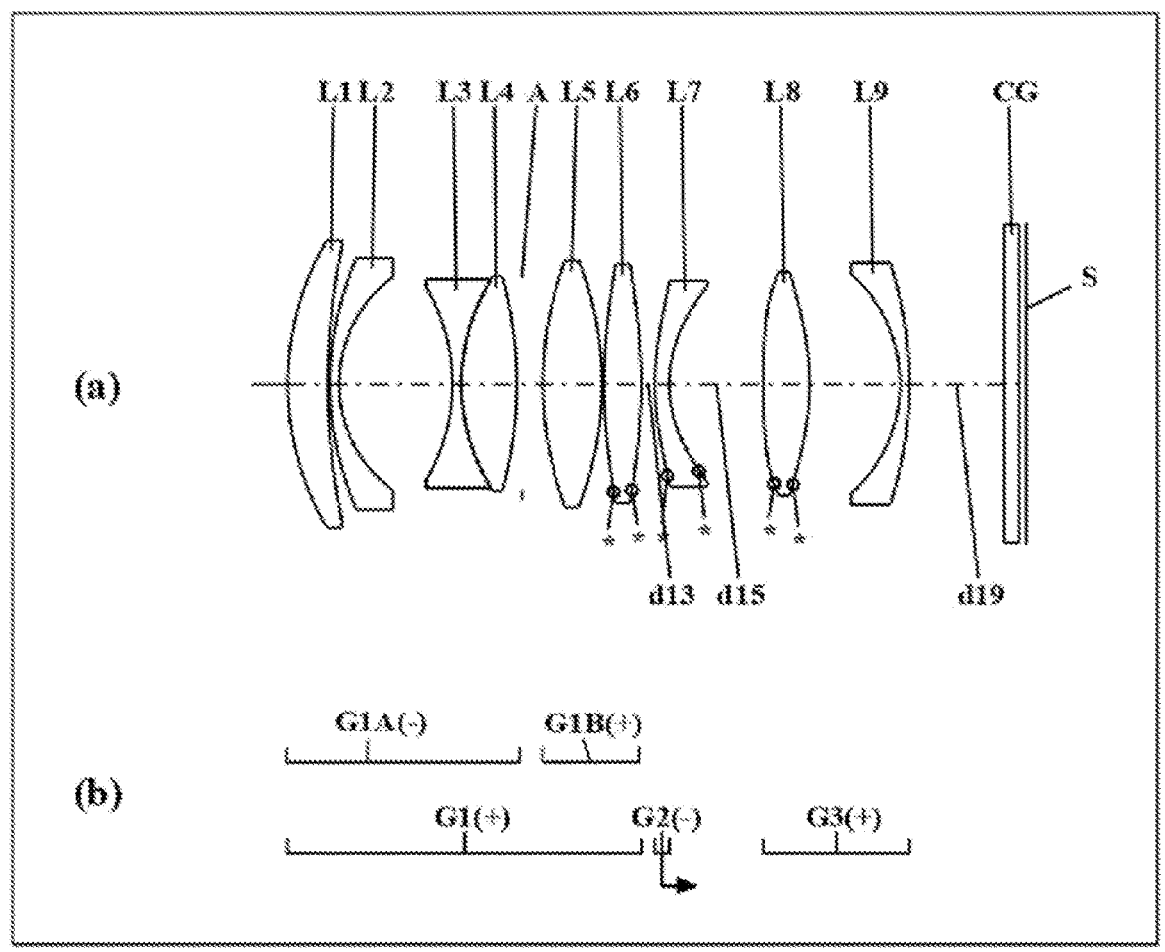
FIG. 1 illustrates lens arrangements showing an infinity in-focus state of an imaging optical system according to a first embodiment (corresponding to a first example of numerical values)
Figure 2:
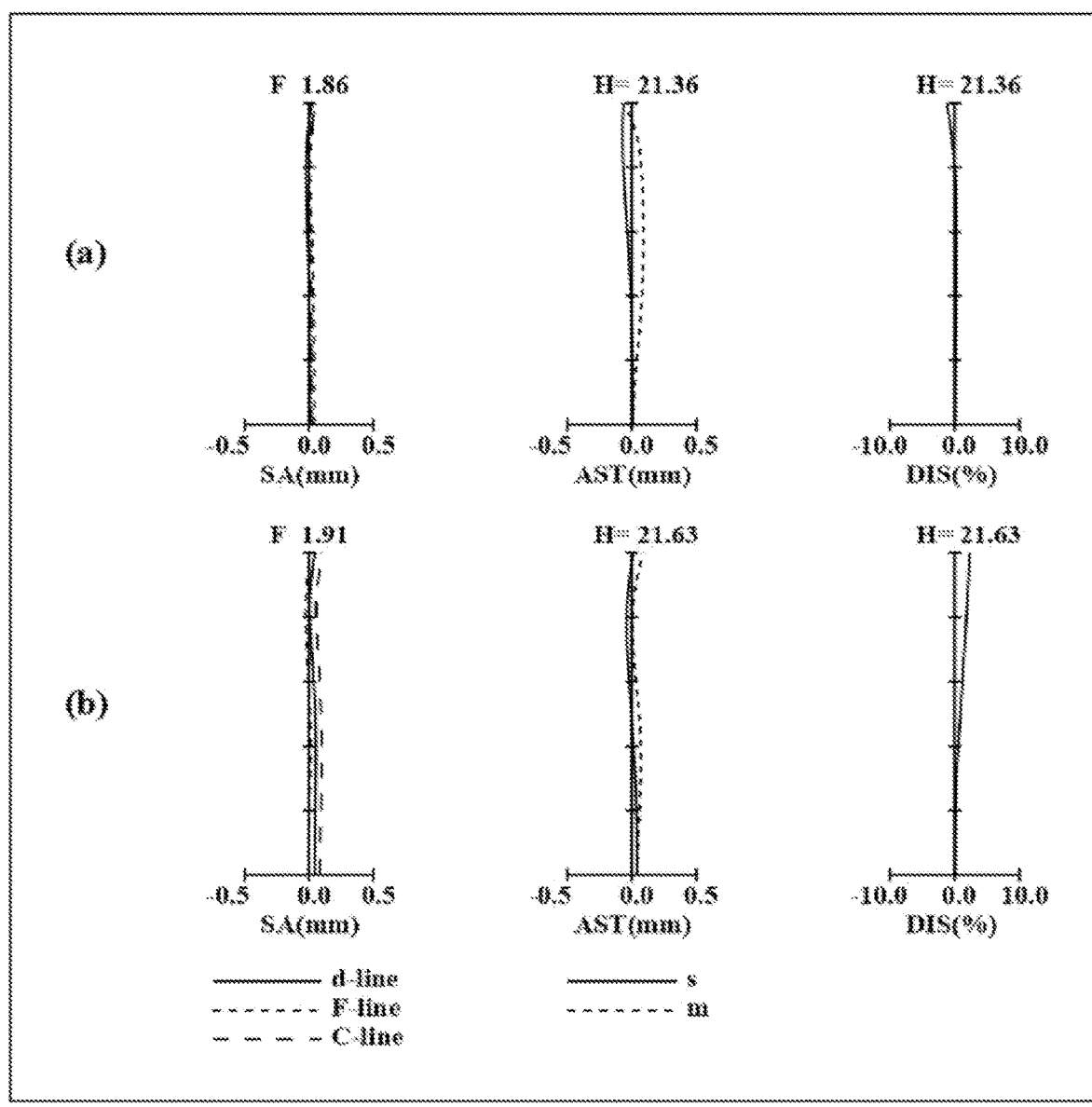
FIG. 2 illustrates longitudinal aberration diagrams showing what state the imaging optical system assumes in the first example of numerical values.

Embodiments of the present disclosure will now be described in detail with reference to the accompanying drawings as appropriate. Note that unnecessarily detailed description will be omitted. For example, detailed description of already well-known matters and redundant description of substantially the same configuration will be omitted. This is done to avoid making the following description overly redundant and thereby help one of ordinary skill in the art understand the present disclosure easily.

In addition, note that the accompanying drawings and the following description are provided by the applicant to help one of ordinary skill in the art understand the present disclosure fully and should not be construed as limiting the scope of the present disclosure, which is defined by the appended claims.

First to Fifth Embodiments

FIGS. 1, 3, 5, 7, and 9 illustrate lens arrangements and operations of an imaging optical system according to first to fifth embodiments, respectively.

As used herein, the terms "in-focus," "focusing," and "focus" refer to the imaging optical system is "in focus" state, "focusing," and in "focus" unless otherwise stated. In addition, the "optical axis" as used herein refers to the optical axis of the imaging optical system unless otherwise stated.

Portion (a) of FIGS. 1, 3, 5, 7, and 9 illustrates lens arrangements in the infinity in-focus state. In portion (a) of FIGS. 1, 3, 5, 7, and 9, the straight line drawn at the right end indicates the position of the image plane S (corresponding to a plane on which the image sensor is disposed, and which faces the object as will be described later). Thus, in each of these drawings, the left side corresponds to the object side. In addition, a low-pass filter or cover glass CG, for example, may be arranged between the lens group on the last stage facing the image plane S and the image plane S. Note that respective portions (a) of FIGS. 1, 3, 5, 7, and 9 have the same aspect ratio.

In portion (a) of FIGS. 1, 3, 5, 7, and 9, the asterisk (*) attached to a surface of a particular lens indicates that the surface is an aspheric surface. Note that in the lenses, an object-side surface or an image-side surface having no asterisks is a spherical surface.

On the second row of portion (b) of FIGS. 1, 3, 5, 7, and 9, the respective lens groups are designated by the reference signs G1-G3 corresponding to their respective positions shown in portion (a). Furthermore, the signs (+) and (−) added to the reference signs of the respective lens groups G1-G3 in portion (b) of FIGS. 1, 3, 5, 7, and 9 indicate the powers of the respective lens groups G1-G3. That is to say, the positive sign (+) indicates positive power, and the negative sign (−) indicates negative power.

Also, on the first row of portion (b) of FIGS. 1, 3, 5, 7, and 9, shown are sub-lens groups of the lens groups G1-G3 shown on the second row of portion (b). The sign (+) or (−) is added to each sub-lens group. The signs (+) and (−) added to the reference signs of the respective sub-lens groups (G1A, G1B, G2A, G2B) in portion (b) of FIGS. 1, 3, 5, 7, and 9 indicate the powers of the respective sub-lens groups (G1A, G1B, G2A, G2B). That is to say, the positive sign (+) indicates positive power, and the negative sign (−) indicates negative power.

Also, either on the first row or second row of portion (b) of FIGS. 1, 3, 5, 7, and 9, an arrow indicating the direction of movement while the imaging optical system is focusing to make a transition from the infinity in-focus state toward the close-object in-focus state is drawn under the reference sign of a particular lens group or particular sub-lens group.

First Embodiment

An imaging optical system according to a first embodiment will be described with reference to FIG. 1.

FIG. 1 illustrates lens arrangements showing an infinity in-focus state of an imaging optical system according to a first embodiment and also illustrates how the imaging optical system operates in the infinity in-focus state.

As shown in FIG. 1, the imaging optical system according to this embodiment includes a first lens group G1 having positive power, a second lens group G2 having negative power, a third lens group G3 having positive power, and a cover glass CG. The first, second, and third lens groups G1-G3 and the cover glass CG are arranged in this order such that the first lens group G1 is located closer to the object than any other member of the imaging optical system and that the cover glass CG is located closer to the image than any other member of the imaging optical system.

The first lens group G1 is made up of a sub-lens group G1A having negative power, an aperture stop A, and a sub-lens group G1B having positive power. The sub-lens group G1A, the aperture stop A, and the sub-lens group G1B are arranged in this order such that the sub-lens group G1A is located closest to the object in the first lens group G1 and that the sub-lens group G1B is located closest to the image in the first lens group G1.

The sub-lens group G1A is made up of a first lens L1 having positive power, a second lens L2 having negative power, a third lens L3 having negative power, and a fourth lens L4 having positive power. The first to fourth lenses L1-L4 are arranged in this order such that the first lens L1 is located closest to the object in the sub-lens group G1A and that the fourth lens L4 is located closest to the image in the sub-lens group G1A.

The sub-lens group G1B is made up of a fifth lens L5 having positive power and a sixth lens L6 having positive power. The fifth and sixth lenses L5, L6 are arranged in this order such that the fifth lens L5 is located closer to the object than the sixth lens L6 is and that the sixth lens L6 is located closer to the image than the fifth lens L5 is.

The third lens L3 and the fourth lens L4 are bonded together with an adhesive such as a UV curable resin to form a bonded lens. In other words, the bonded lens includes the third lens L3 and the fourth lens L4.

The second lens group G2 consists of a seventh lens L7 having negative power.

The third lens group G3 is made up of an eighth lens L8 having positive power and a ninth lens L9 having negative power.

Next, the respective lenses that form these lens groups of the imaging optical system according to this embodiment will be described.

First, the respective lenses that form the sub-lens group G1A will be described.

The first lens L1 is a meniscus lens having a convex object-side surface. The second lens L2 is a meniscus lens having a convex object-side surface. The third lens L3 is a biconcave lens. The fourth lens L4 is a biconvex lens. The first lens L1 is an example of the lens L1A1. The second lens L2 is an example of the lens L1A2.

Next, the respective lenses that form the sub-lens group G1B will be described.

The fifth lens L5 is a biconvex lens. The sixth lens L6 is a biconvex lens, both surfaces of which are aspheric surfaces. The sixth lens L6 is an example of the lens L1BE.

Next, the lens that forms the second lens group G2 will be described.

The seventh lens L7 is a meniscus lens having a convex object-side surface. Both surfaces of the seventh lens L7 are aspheric surfaces. The seventh lens L7 is an example of the lens LFN and the lens L2F.

Next, the respective lenses that form the third lens group G3 will be described.

The eighth lens L8 is a biconvex lens, both surfaces of which are aspheric surfaces. The ninth lens L9 is a meniscus lens having a convex image-side surface. The eighth lens L8 is an example of the lens L3P. The ninth lens L9 is an example of the lens L3E.

While the imaging optical system according to this embodiment is focusing to make a transition from an infinity in-focus state toward a close-object in-focus state, the first lens group GT does not move, the aperture stop A does not move, either, the second lens group G2 moves along the optical axis toward the image, and the third lens group G3 does not move.

That is to say, the imaging optical system performs focusing such that an interval (d13) on the optical axis between a surface, located closest to the image, of the first lens group GT and a surface, located closest to the object, of the second lens group G2 and an interval (d15) on the optical axis between a surface, located closest to the image, of the second lens group G2 and a surface, located closest to the object, of the third lens group G3 change.

More specifically, while the imaging optical system is focusing to make a transition from the infinity in-focus state toward the close-object in-focus state, the seventh lens L7 moves toward the image.

In this embodiment, the surface, located closest to the image, of the first lens group G1 is the image-side surface of the sixth lens L6. The surface, located closest to the object, of the second lens group G2 is the object-side surface of the seventh lens L7. The surface, located closest to the image, of the second lens group G2 is the image-side surface of the seventh lens L7. The surface, located closest to the object, of the third lens group G3 is the object-side surface of the eighth lens L8.

Second Embodiment

An imaging optical system according to a second embodiment will be described with reference to FIG. 3.

Figure 3:
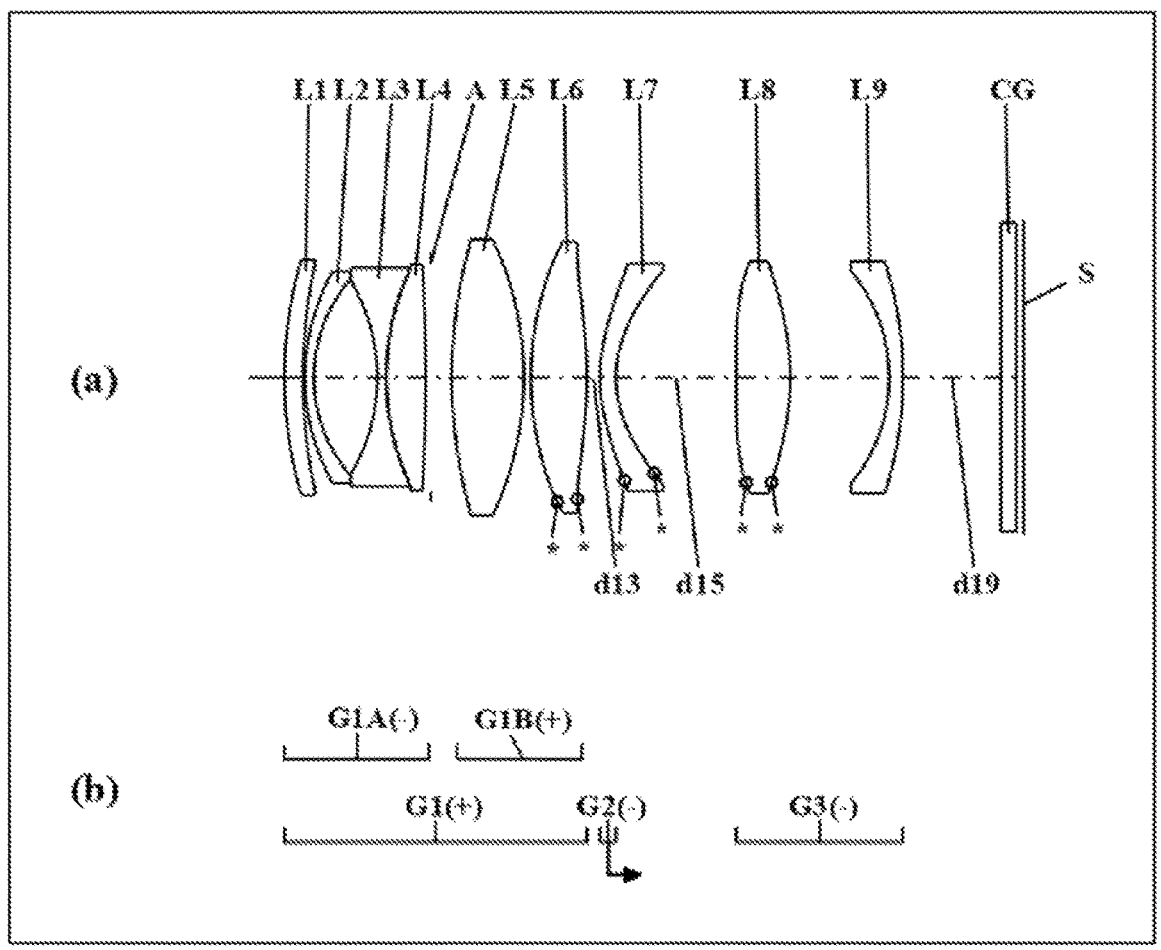
FIG. 3 illustrates lens arrangements showing an infinity in-focus state of an imaging optical system according to a second embodiment (corresponding to a second example of numerical values)
Figure 4:
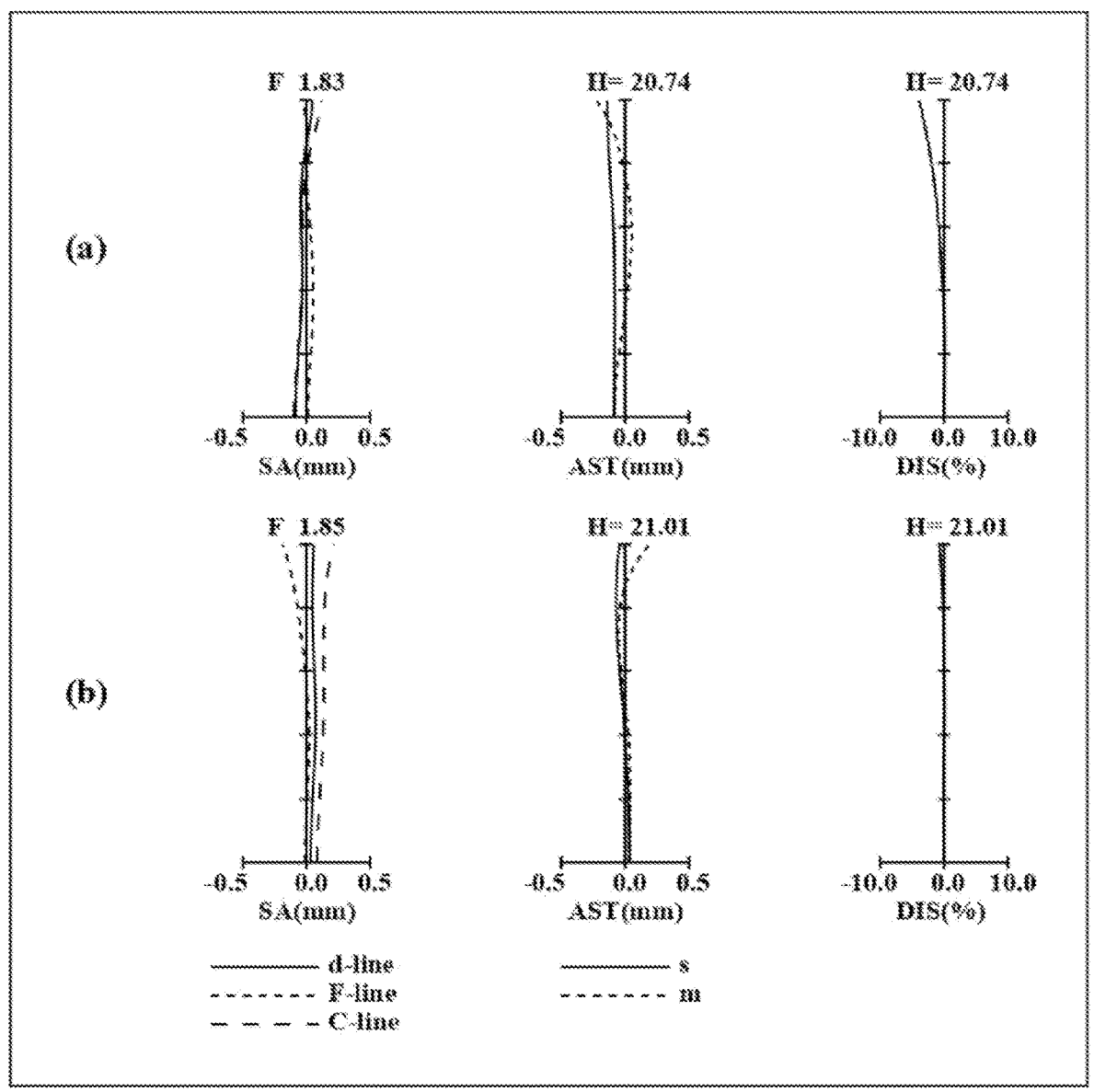
FIG. 4 illustrates longitudinal aberration diagrams showing what state the imaging optical system assumes in the second example of numerical values.

FIG. 3 illustrates lens arrangements showing an infinity in-focus state of an imaging optical system according to a second embodiment and also illustrates how the imaging optical system operates in the infinity in-focus state.

As shown in FIG. 3, the imaging optical system according to this embodiment includes a first lens group G1 having positive power, a second lens group G2 having negative power, a third lens group G3 having negative power, and a cover glass CG. The first, second, and third lens groups G1-G3 and the cover glass CG are arranged in this order such that the first lens group G1 is located closer to the object than any other member of the imaging optical system and that the cover glass CG is located closer to the image than any other member of the imaging optical system.

The first lens group G1 is made up of a sub-lens group G1A having negative power, an aperture stop A, and a sub-lens group G1B having positive power. The sub-lens group G1A, the aperture stop A, and the sub-lens group G1B are arranged in this order such that the sub-lens group G1A is located closest to the object in the first lens group G1 and that the sub-lens group G1B is located closest to the image in the first lens group G1.

The sub-lens group G1A is made up of a first lens L1 having positive power, a second lens L2 having negative power, a third lens L3 having negative power, and a fourth lens L4 having positive power. The first to fourth lenses L1-L4 are arranged in this order such that the first lens L1 is located closest to the object in the sub-lens group G1A and that the fourth lens L4 is located closest to the image in the sub-lens group G1A.

The sub-lens group G1B is made up of a fifth lens L5 having positive power and a sixth lens L6 having positive power. The fifth and sixth lenses L5, L6 are arranged in this order such that the fifth lens L5 is located closer to the object than the sixth lens L6 is and that the sixth lens L6 is located closer to the image than the fifth lens L5 is.

The third lens L3 and the fourth lens L4 are bonded together with an adhesive such as a UV curable resin to form a bonded lens. In other words, the bonded lens includes the third lens L3 and the fourth lens L4.

The second lens group G2 consists of a seventh lens L7 having negative power.

The third lens group G3 is made up of an eighth lens L8 having positive power and a ninth lens L9 having negative power.

Next, the respective lenses that form these lens groups of the imaging optical system according to this embodiment will be described.

First, the respective lenses that form the sub-lens group G1A will be described.

The first lens L1 is a meniscus lens having a convex object-side surface. The second lens L2 is a meniscus lens having a convex object-side surface. The third lens L3 is a biconcave lens. The fourth lens L4 is a biconvex lens. The first lens L1 is an example of the lens L1A1. The second lens L2 is an example of the lens L1A2.

Next, the respective lenses that form the sub-lens group G1B will be described.

The fifth lens L5 is a biconvex lens. The sixth lens L6 is a biconvex lens, both surfaces of which are aspheric surfaces. The sixth lens L6 is an example of the lens L1BE.

Next, the lens that forms the second lens group G2 will be described.

The seventh lens L7 is a meniscus lens having a convex object-side surface. Both surfaces of the seventh lens L7 are aspheric surfaces. The seventh lens L7 is an example of the lens LFN and the lens L2F.

Next, the respective lenses that form the third lens group G3 will be described.

The eighth lens L8 is a biconvex lens, both surfaces of which are aspheric surfaces. The ninth lens L9 is a meniscus lens having a convex image-side surface. The eighth lens L8 is an example of the lens L3P. The ninth lens L9 is an example of the lens L3E.

While the imaging optical system according to this embodiment is focusing to make a transition from an infinity in-focus state toward a close-object in-focus state, the first lens group GT does not move, the aperture stop A does not move, either, the second lens group G2 moves along the optical axis toward the image, and the third lens group G3 does not move.

That is to say, the imaging optical system performs focusing such that an interval (d13) on the optical axis between a surface, located closest to the image, of the first lens group GT and a surface, located closest to the object, of the second lens group G2 and an interval (d15) on the optical axis between a surface, located closest to the image, of the second lens group G2 and a surface, located closest to the object, of the third lens group G3 change.

More specifically, while the imaging optical system is focusing to make a transition from the infinity in-focus state toward the close-object in-focus state, the seventh lens L7 moves toward the image.

In this embodiment, the surface, located closest to the image, of the first lens group G1 is the image-side surface of the sixth lens L6. The surface, located closest to the object, of the second lens group G2 is the object-side surface of the seventh lens L7. The surface, located closest to the image, of the second lens group G2 is the image-side surface of the seventh lens L7. The surface, located closest to the object, of the third lens group G3 is the object-side surface of the eighth lens L8.

Third Embodiment

An imaging optical system according to a third embodiment will be described with reference to FIG. 5.

Figure 5:
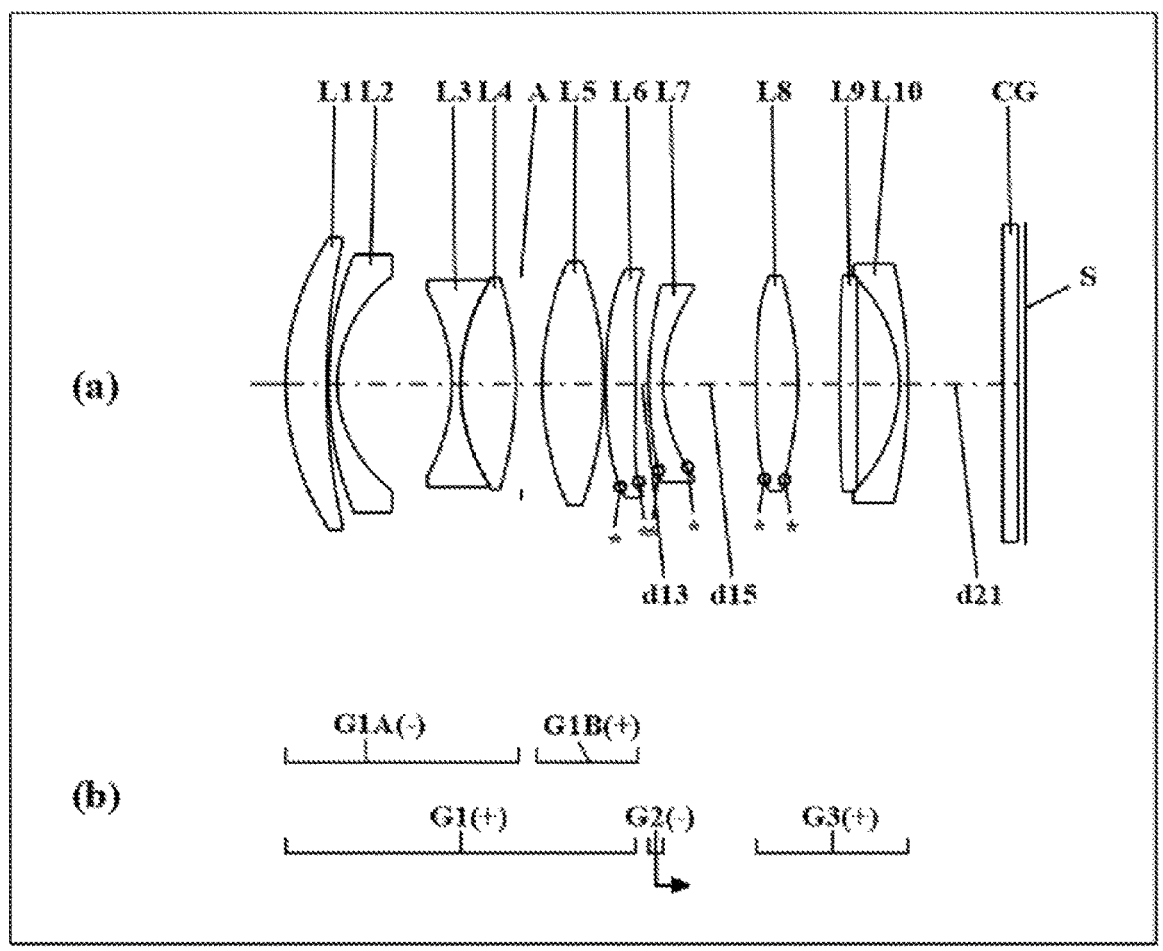
FIG. 5 illustrates lens arrangements showing an infinity in-focus state of an imaging optical system according to a third embodiment (corresponding to a third example of numerical values)
Figure 6:
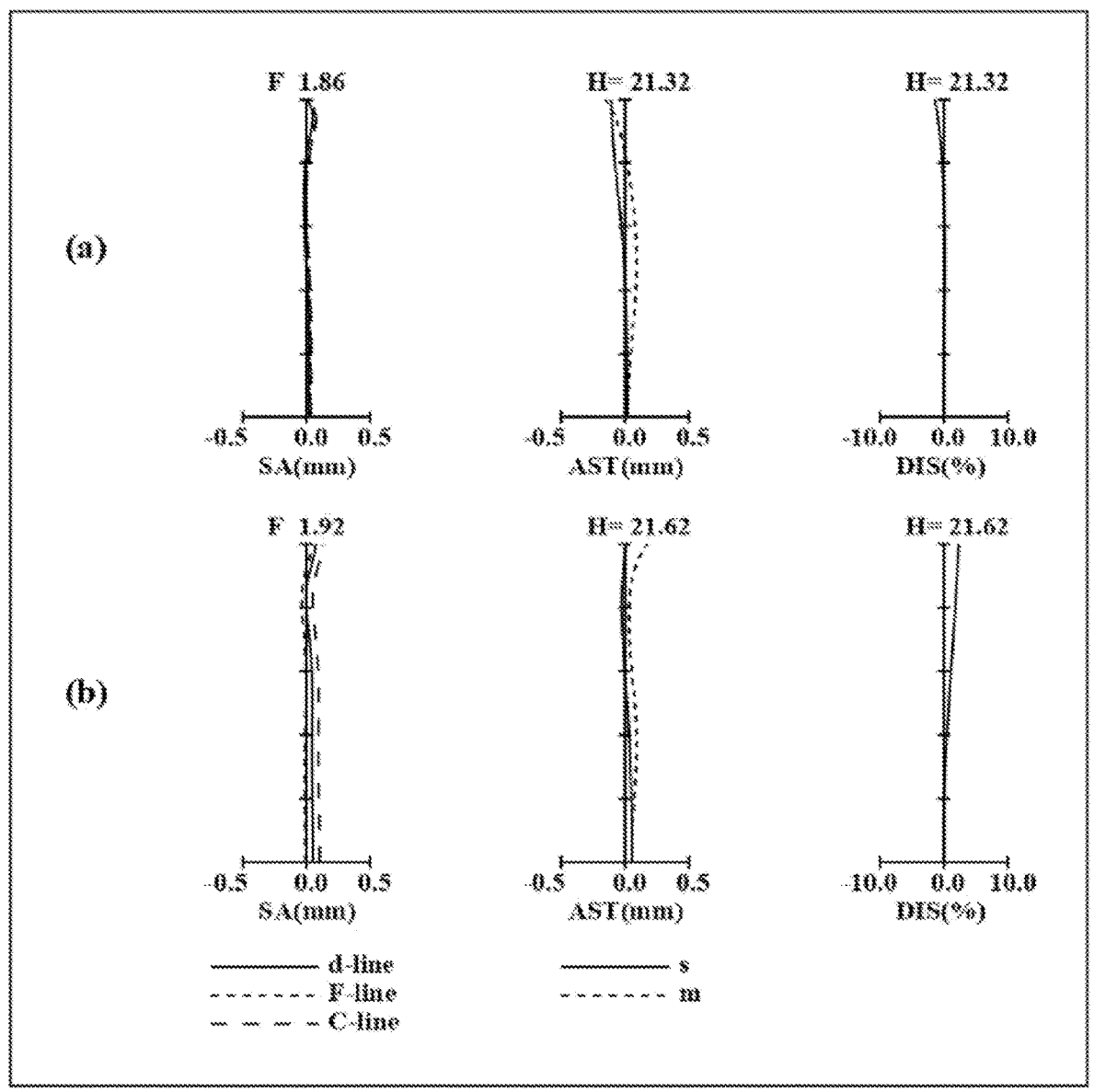
FIG. 6 illustrates longitudinal aberration diagrams showing what state the imaging optical system assumes in the third example of numerical values.

FIG. 5 illustrates lens arrangements showing an infinity in-focus state of an imaging optical system according to a third embodiment and also illustrates how the imaging optical system operates in the infinity in-focus state.

As shown in FIG. 5, the imaging optical system according to this embodiment includes a first lens group G1 having positive power, a second lens group G2 having negative power, a third lens group G3 having positive power, and a cover glass CG. The first, second, and third lens groups G1-G3 and the cover glass CG are arranged in this order such that the first lens group G1 is located closer to the object than any other member of the imaging optical system and that the cover glass CG is located closer to the image than any other member of the imaging optical system.

The first lens group G1 is made up of a sub-lens group G1A having negative power, an aperture stop A, and a sub-lens group G1B having positive power. The sub-lens group G1A, the aperture stop A, and the sub-lens group G1B are arranged in this order such that the sub-lens group G1A is located closest to the object in the first lens group G1 and that the sub-lens group G1B is located closest to the image in the first lens group G1.

The sub-lens group G1A is made up of a first lens L1 having positive power, a second lens L2 having negative power, a third lens L3 having negative power, and a fourth lens L4 having positive power. The first to fourth lenses L1-L4 are arranged in this order such that the first lens L1 is located closest to the object in the sub-lens group G1A and that the fourth lens L4 is located closest to the image in the sub-lens group G1A.

The sub-lens group G1B is made up of a fifth lens L5 having positive power and a sixth lens L6 having positive power. The fifth and sixth lenses L5, L6 are arranged in this order such that the fifth lens L5 is located closer to the object than the sixth lens L6 is and that the sixth lens L6 is located closer to the image than the fifth lens L5 is.

The third lens L3 and the fourth lens L4 are bonded together with an adhesive such as a UV curable resin to form a bonded lens. In other words, the bonded lens includes the third lens L3 and the fourth lens L4.

The second lens group G2 consists of a seventh lens L7 having negative power.

The third lens group G3 is made up of an eighth lens L8 having positive power, a ninth lens L9 having positive power, and a tenth lens L10 having negative power.

Next, the respective lenses that form these lens groups of the imaging optical system according to this embodiment will be described.

First, the respective lenses that form the sub-lens group G1A will be described.

The first lens L1 is a meniscus lens having a convex object-side surface. The second lens L2 is a meniscus lens having a convex object-side surface. The third lens L3 is a biconcave lens. The fourth lens L4 is a biconvex lens. The first lens L1 is an example of the lens L1A1. The second lens L2 is an example of the lens L1A2.

Next, the respective lenses that form the sub-lens group G1B will be described.

The fifth lens L5 is a biconvex lens. The sixth lens L6 is a biconvex lens, both surfaces of which are aspheric surfaces. The sixth lens L6 is an example of the lens L1BE.

Next, the lens that forms the second lens group G2 will be described.

The seventh lens L7 is a meniscus lens having a convex object-side surface. Both surfaces of the seventh lens L7 are aspheric surfaces. The seventh lens L7 is an example of the lens LFN and the lens L2F.

Next, the respective lenses that form the third lens group G3 will be described.

The eighth lens L8 is a biconvex lens, both surfaces of which are aspheric surfaces. The ninth lens L9 is a biconvex lens. The tenth lens L10 is a meniscus lens having a convex image-side surface. The ninth lens L9 is an example of the lens L3P. The tenth lens L10 is an example of the lens L3E.

While the imaging optical system according to this embodiment is focusing to make a transition from an infinity in-focus state toward a close-object in-focus state, the first lens group GT does not move, the aperture stop A does not move, either, the second lens group G2 moves along the optical axis toward the image, and the third lens group G3 does not move.

That is to say, the imaging optical system performs focusing such that an interval (d13) on the optical axis between a surface, located closest to the image, of the first lens group GT and a surface, located closest to the object, of the second lens group G2 and an interval (d15) on the optical axis between a surface, located closest to the image, of the second lens group G2 and a surface, located closest to the object, of the third lens group G3 change.

More specifically, while the imaging optical system is focusing to make a transition from the infinity in-focus state toward the close-object in-focus state, the seventh lens L7 moves toward the image.

In this embodiment, the surface, located closest to the image, of the first lens group G1 is the image-side surface of the sixth lens L6. The surface, located closest to the object, of the second lens group G2 is the object-side surface of the seventh lens L7. The surface, located closest to the image, of the second lens group G2 is the image-side surface of the seventh lens L7. The surface, located closest to the object, of the third lens group G3 is the object-side surface of the eighth lens L8.

Fourth Embodiment

An imaging optical system according to a fourth embodiment will be described with reference to FIG. 7.

Figure 7:
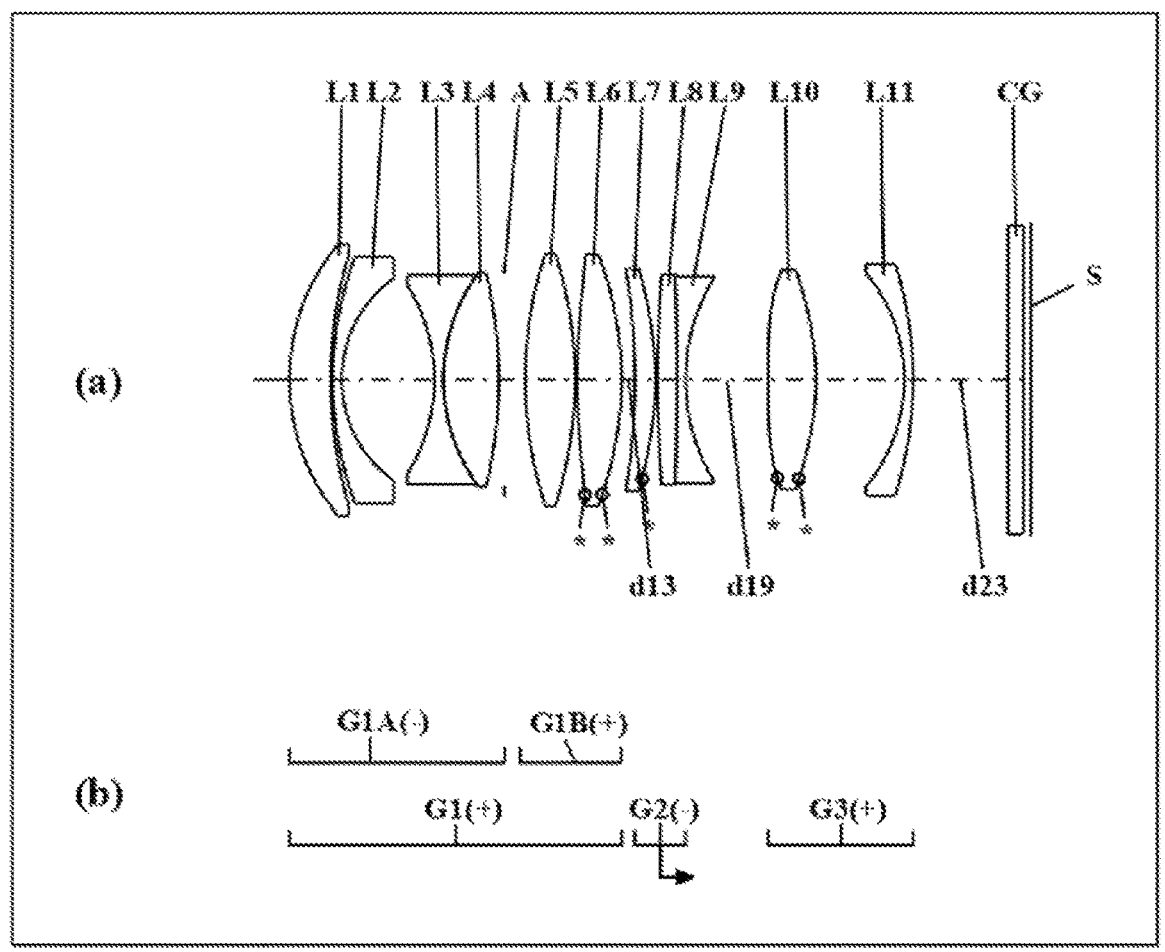
FIG. 7 illustrates lens arrangements showing an infinity in-focus state of an imaging optical system according to a fourth embodiment (corresponding to a fourth example of numerical values)
Figure 8:
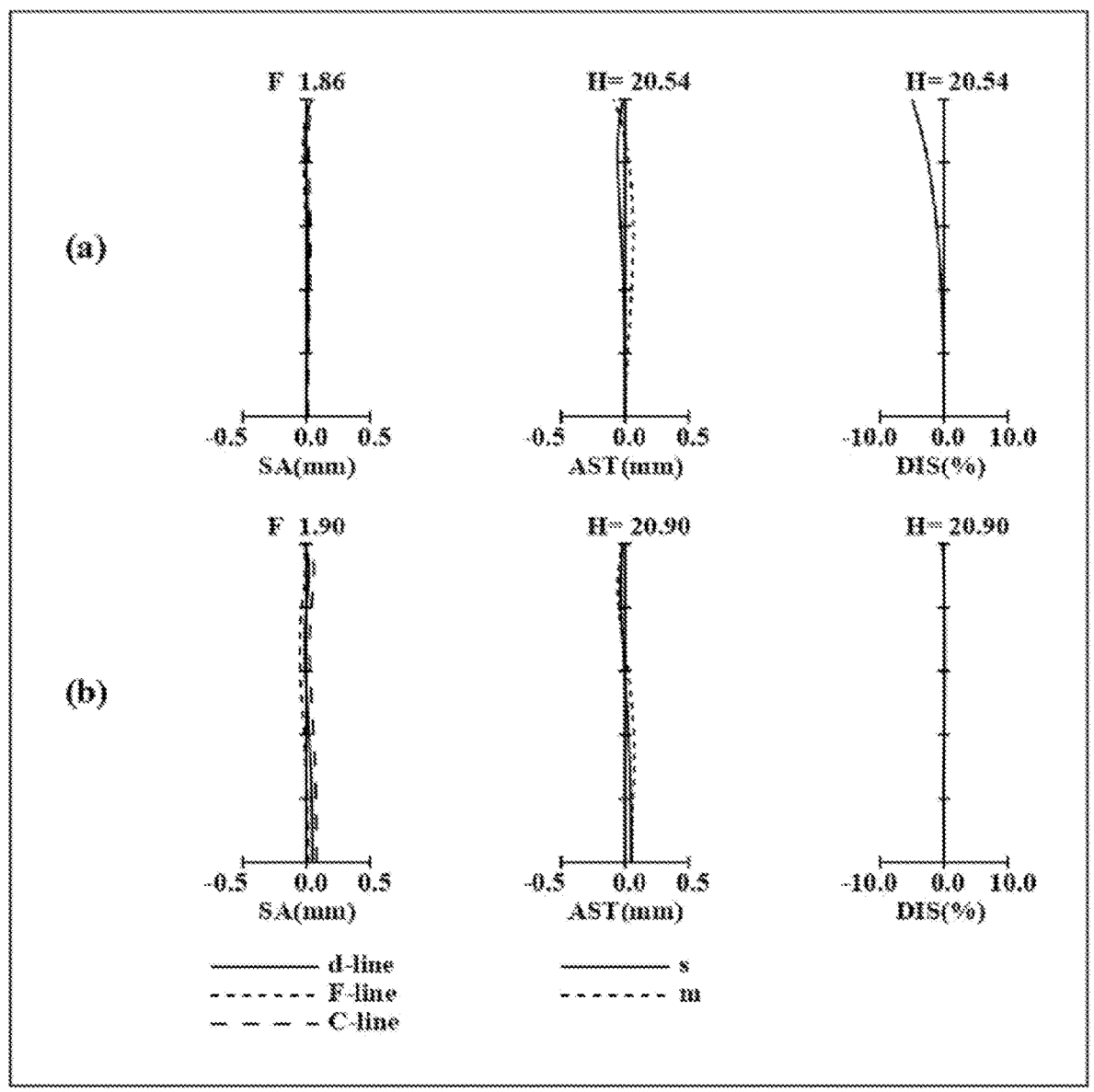
FIG. 8 illustrates longitudinal aberration diagrams showing what state the imaging optical system assumes in the fourth example of numerical values.

FIG. 7 illustrates lens arrangements showing an infinity in-focus state of an imaging optical system according to a fourth embodiment and also illustrates how the imaging optical system operates in the infinity in-focus state.

As shown in FIG. 7, the imaging optical system according to this embodiment includes a first lens group G1 having positive power, a second lens group G2 having negative power, a third lens group G3 having positive power, and a cover glass CG. The first, second, and third lens groups G1-G3 and the cover glass CG are arranged in this order such that the first lens group G1 is located closer to the object than any other member of the imaging optical system and that the cover glass CG is located closer to the image than any other member of the imaging optical system.

The first lens group G1 is made up of a sub-lens group G1A having negative power, an aperture stop A, and a sub-lens group G1B having positive power. The sub-lens group G1A, the aperture stop A, and the sub-lens group G1B are arranged in this order such that the sub-lens group G1A is located closest to the object in the first lens group G1 and that the sub-lens group G1B is located closest to the image in the first lens group G1.

The sub-lens group G1A is made up of a first lens L1 having positive power, a second lens L2 having negative power, a third lens L3 having negative power, and a fourth lens L4 having positive power. The first to fourth lenses L1-L4 are arranged in this order such that the first lens L1 is located closest to the object in the sub-lens group G1A and that the fourth lens L4 is located closest to the image in the sub-lens group G1A.

The sub-lens group G1B is made up of a fifth lens L5 having positive power and a sixth lens L6 having positive power. The fifth and sixth lenses L5, L6 are arranged in this order such that the fifth lens L5 is located closer to the object than the sixth lens L6 is and that the sixth lens L6 is located closer to the image than the fifth lens L5 is.

The third lens L3 and the fourth lens L4 are bonded together with an adhesive such as a UV curable resin to form a bonded lens. In other words, the bonded lens includes the third lens L3 and the fourth lens L4.

The second lens group G2 is made up of a seventh lens L7 having positive power, an eighth lens L8 having positive power, and a ninth lens L9 having negative power.

The eighth lens L8 and the ninth lens L9 are bonded together with an adhesive such as a UV curable resin to form a bonded lens. In other words, the bonded lens includes the eighth lens L8 and the ninth lens L9.

The third lens group G3 is made up of a tenth lens L10 having positive power and an eleventh lens L11 having negative power.

Next, the respective lenses that form these lens groups of the imaging optical system according to this embodiment will be described.

First, the respective lenses that form the sub-lens group G1A will be described.

The first lens L1 is a meniscus lens having a convex object-side surface. The second lens L2 is a meniscus lens having a convex object-side surface. The third lens L3 is a biconcave lens. The fourth lens L4 is a biconvex lens. The first lens L1 is an example of the lens L1A1. The second lens L2 is an example of the lens L1A2.

Next, the respective lenses that form the sub-lens group G1B will be described.

The fifth lens L5 is a biconvex lens. The sixth lens L6 is a biconvex lens, both surfaces of which are aspheric surfaces. The sixth lens L6 is an example of the lens L1BE.

Next, the respective lenses that form the second lens group G2 will be described.

The seventh lens L7 is a meniscus lens having a convex image-side surface, which is an aspheric surface. The eighth lens L8 is a biconvex lens. The ninth lens L9 is a biconcave lens. The seventh lens L7 is an example of the lens L2F. The ninth lens L9 is an example of the lens LFN.

Next, the respective lenses that form the third lens group G3 will be described.

The tenth lens L10 is a biconvex lens, both surfaces of which are aspheric surfaces. The eleventh lens L11 is a meniscus lens having a convex image-side surface. The tenth lens L10 is an example of the lens L3P. The eleventh lens L11 is an example of the lens L3E.

While the imaging optical system according to this embodiment is focusing to make a transition from an infinity in-focus state toward a close-object in-focus state, the first lens group G1 does not move, the aperture stop A does not move, either, the second lens group G2 moves along the optical axis toward the image, and the third lens group G3 does not move.

That is to say, the imaging optical system performs focusing such that an interval (d13) on the optical axis between a surface, located closest to the image, of the first lens group G1 and a surface, located closest to the object, of the second lens group G2 and an interval (d19) on the optical axis between a surface, located closest to the image, of the second lens group G2 and a surface, located closest to the object, of the third lens group G3 change.

More specifically, while the imaging optical system is focusing to make a transition from the infinity in-focus state toward the close-object in-focus state, the seventh lens L7, the eighth lens L8, and the ninth lens L9 moves together toward the image.

In this embodiment, the surface, located closest to the image, of the first lens group G1 is the image-side surface of the sixth lens L6. The surface, located closest to the object, of the second lens group G2 is the object-side surface of the seventh lens L7. The surface, located closest to the image, of the second lens group G2 is the image-side surface of the ninth lens L9. The surface, located closest to the object, of the third lens group G3 is the object-side surface of the tenth lens L10.

Fifth Embodiment

An imaging optical system according to a fifth embodiment will be described with reference to FIG. 9.

Figure 9:
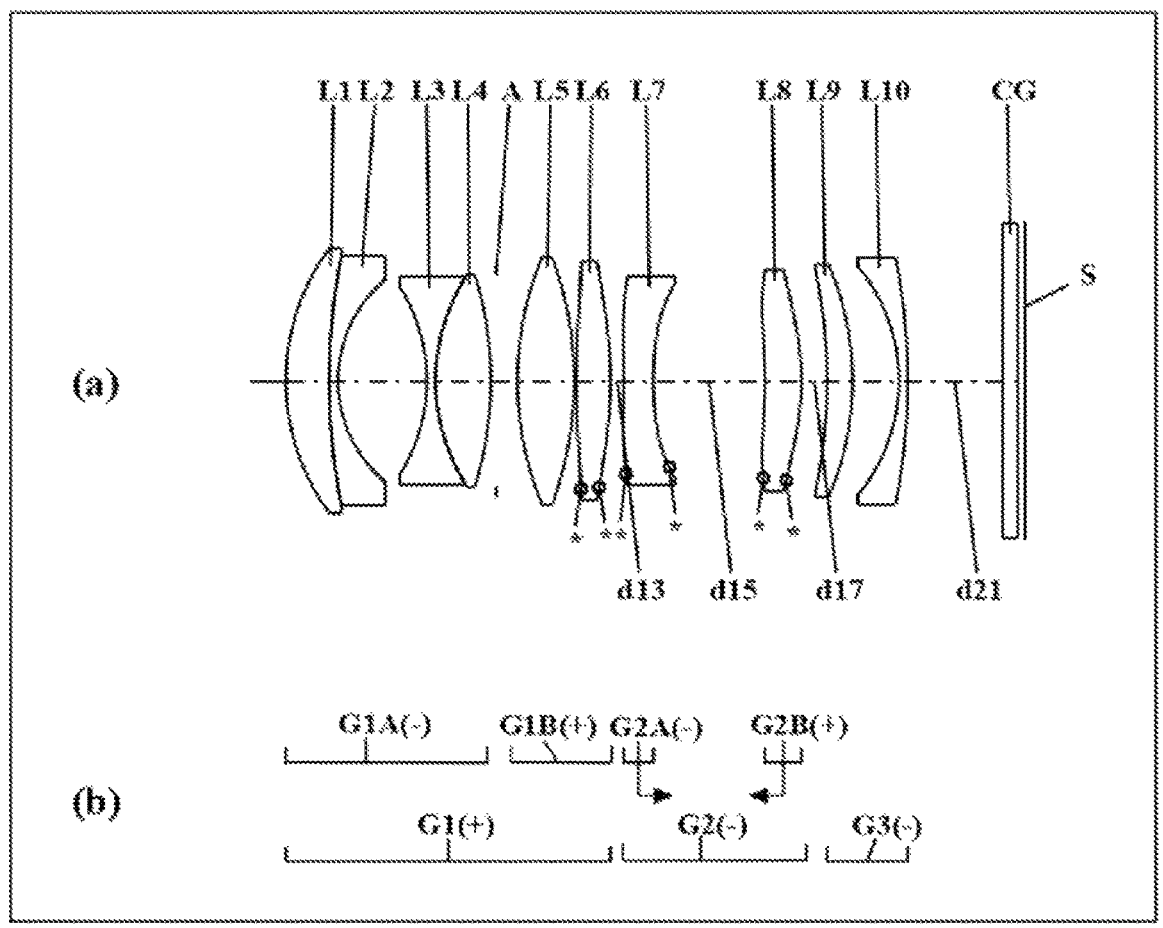
FIG. 9 illustrates lens arrangements showing an infinity in-focus state of an imaging optical system according to a fifth embodiment (corresponding to a fifth example of numerical values)
Figure 10:
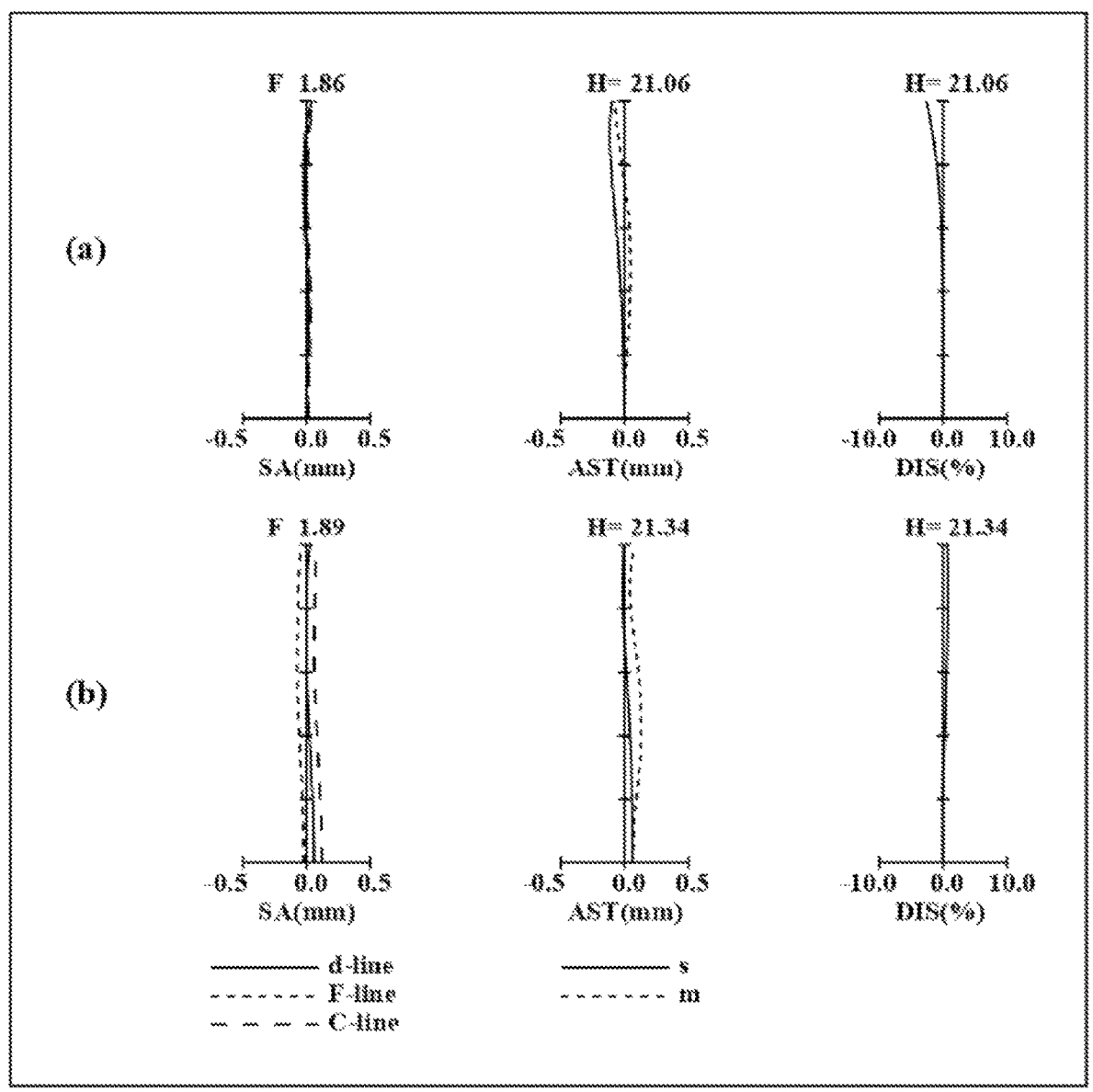
FIG. 10 illustrates longitudinal aberration diagrams showing what state the imaging optical system assumes in the fifth example of numerical values.

FIG. 9 illustrates lens arrangements showing an infinity in-focus state of an imaging optical system according to a fifth embodiment and also illustrates how the imaging optical system operates in the infinity in-focus state.

As shown in FIG. 9, the imaging optical system according to this embodiment includes a first lens group G1 having positive power, a second lens group G2 having negative power, a third lens group G3 having negative power, and a cover glass CG. The first, second, and third lens groups G1-G3 and the cover glass CG are arranged in this order such that the first lens group G1 is located closer to the object than any other member of the imaging optical system and that the cover glass CG is located closer to the image than any other member of the imaging optical system.

The first lens group G1 is made up of a sub-lens group G1A having negative power, an aperture stop A, and a sub-lens group G1B having positive power. The sub-lens group G1A, the aperture stop A, and the sub-lens group G1B are arranged in this order such that the sub-lens group G1A is located closest to the object in the first lens group G1 and that the sub-lens group G1B is located closest to the image in the first lens group G1.

The sub-lens group G1A is made up of a first lens L1 having positive power, a second lens L2 having negative power, a third lens L3 having negative power, and a fourth lens L4 having positive power. The first to fourth lenses L1-L4 are arranged in this order such that the first lens L1 is located closest to the object in the sub-lens group G1A and that the fourth lens L4 is located closest to the image in the sub-lens group G1A.

The first lens L1 and the second lens L2 are bonded together with an adhesive such as a UV curable resin to form a first bonded lens. Likewise, the third lens L3 and the fourth lens L4 are also bonded together with an adhesive such as a UV curable resin to form a second bonded lens. In other words, the first bonded lens includes the first lens L1 and the second lens L2, and the second bonded lens includes the third lens L3 and the fourth lens L4.

The sub-lens group G1B is made up of a fifth lens L5 having positive power and a sixth lens L6 having positive power. The fifth and sixth lenses L5, L6 are arranged in this order such that the fifth lens L5 is located closer to the object than the sixth lens L6 is and that the sixth lens L6 is located closer to the image than the fifth lens L5 is.

The second lens group G2 is made up of a sub-lens group G2A having negative power and a sub-lens group G2B having positive power. The sub-lens group G2A and the sub-lens group G2B are arranged in this order such that the sub-lens group G2A is located closer to the object than the sub-lens group G2B is and that the sub-lens group G2B is located closer to the image than the sub-lens group G1B is.

The sub-lens group G2A consists of a seventh lens L7 having negative power.

The sub-lens group G2B consists of an eighth lens L8 having positive power.

The third lens group G3 is made up of a ninth lens L9 having positive power and a tenth lens L10 having negative power.

Next, the respective lenses that form these lens groups of the imaging optical system according to this embodiment will be described.

First, the respective lenses that form the sub-lens group G1A will be described.

The first lens L1 is a meniscus lens having a convex object-side surface. The second lens L2 is a meniscus lens having a convex object-side surface. The third lens L3 is a biconcave lens. The fourth lens L4 is a biconvex lens. The first lens L1 is an example of the lens L1A1. The second lens L2 is an example of the lens L1A2.

Next, the respective lenses that form the sub-lens group G1B will be described.

The fifth lens L5 is a biconvex lens. The sixth lens L6 is a biconvex lens, both surfaces of which are aspheric surfaces. The sixth lens L6 is an example of the lens L1BE.

Next, the lens that forms the sub-lens group G2A will be described.

The seventh lens L7 is a biconcave lens, both surfaces of which are aspheric surfaces. The seventh lens L7 is an example of the lens LFN and the lens L2F.

Next, the lens that forms the sub-lens group G2B will be described.

The eighth lens L8 is a meniscus lens having a convex image-side surface. Both surfaces of the eighth lens L8 are aspheric surfaces.

Next, the respective lenses that form the third lens group G3 will be described.

The ninth lens L9 is a meniscus lens having a convex image-side surface. The tenth lens L10 is a meniscus lens having a convex image-side surface. The ninth lens L9 is an example of the lens L3P. The tenth lens L10 is an example of the lens L3E.

While the imaging optical system according to this embodiment is focusing to make a transition from an infinity in-focus state toward a close-object in-focus state, the first lens group G1 does not move, the aperture stop A does not move, either, the sub-lens group G2A in the second lens group G2 moves along the optical axis toward the image, the sub-lens group G2B in the second lens group G2 moves along the optical axis toward the object, and the third lens group G3 does not move.

That is to say, the imaging optical system performs focusing such that an interval (d13) on the optical axis between a surface, located closest to the image, of the first lens group G1 and a surface, located closest to the object, of the second lens group G2 and an interval (d17) on the optical axis between a surface, located closest to the image, of the second lens group G2 and a surface, located closest to the object, of the third lens group G3 change.

More specifically, while the imaging optical system is focusing to make a transition from the infinity in-focus state toward the close-object in-focus state, the seventh lens L7 moves toward the image and the eighth lens L8 moves toward the object.

In this embodiment, the surface, located closest to the image, of the first lens group G1 is the image-side surface of the sixth lens L6. The surface, located closest to the object, of the second lens group G2 is the object-side surface of the seventh lens L7. The surface, located closest to the image, of the second lens group G2 is the image-side surface of the eighth lens L8. The surface, located closest to the object, of the third lens group G3 is the object-side surface of the ninth lens L9.

(Conditions and Advantages)

Next, conditions that an imaging optical system such as the ones according to the first to fifth embodiments described above may satisfy will be described. That is to say, a plurality of conditions may be defined for the imaging optical system according to each of these five embodiments. In that case, an imaging optical system, of which the configuration satisfies all of these conditions, is most advantageous. Alternatively, an imaging optical system that achieves its expected advantages by satisfying any of the individual conditions to be described below may also be obtained.

An imaging optical system according to the present disclosure, such as the imaging optical systems according to the first to fifth embodiments described above, includes: a first lens group G1 having positive power; a second lens group G2 having power; and a third lens group G3 having power. The first, second, and third lens groups G1, G2, G3 are arranged in this order such that the first lens group G1 is located closer to an object than any other lens group of the imaging optical system is. The first lens group G1 and the third lens group G3 do not move along the optical axis while the imaging optical system is focusing. In other words, while the imaging optical system is focusing, the first lens group G1 and the third lens group G3 stand still along the optical axis. The second lens group includes at least one lens LFN having negative power. The at least one lens LFN moves along the optical axis such that a first interval and a second interval change while the imaging optical system is focusing. The first interval is an interval on the optical axis between a surface, located closest to an image, of the first lens group G1 and a surface, located closest to the object, of the second lens group G2. The second interval is an interval on the optical axis between a surface, located closest to the image, of the second lens group G2 and a surface, located closest to the object, of the third lens group G3.

The first lens group G1 includes: a sub-lens group G1A; an aperture stop A; and a sub-lens group G1B. The sub-lens group G1A, the aperture stop A, and the sub-lens group G1B are arranged in this order such that the sub-lens group G1A is located closer to the object than any other component of the first lens group G1 is.

The sub-lens group G1A includes: a lens L1A1; and a lens L1A2 located adjacent to, and closer to the image than, the lens L1A1. The lens L1A1 and the lens L1A2 are arranged in this order such that the lens L1A1 is located closer to the object than any other component, including the lens L1A2, of the sub-lens group G1A is.

An object-side surface of the lens L1A1 is convex toward the object.

The third lens group G3 includes: a lens L3E having negative power; and a lens L3P located adjacent to, and closer to the object than, the lens L3E. The lens L3E and the lens L3P are arranged in this order such that the lens L3E is located closer to the image than any other component, including the lens L3P, of the third lens group is.

This basic configuration enables providing an imaging optical system with the ability to compensate for various types of aberrations sufficiently.

In addition, this basic configuration allows even an imaging optical system having as high an F value as about 2.4 or more that ensures high brightness to achieve excellent performance and downsizing at a time.

The imaging optical system having this basic configuration preferably satisfies the condition expressed by the following Inequality (1):

$$0.1 < L\_STO/LL < 0.6 \quad (1)$$

where L_STO is an interval on the optical axis between an object-side surface of the lens L1A1 and the aperture stop A, and LL is an interval on the optical axis between the object-side surface of the lens L1A1 and an image-side surface of the lens L3E. Note that the units of these parameters should be the same (e.g., the units of L_STO and LL are both millimeters).

The condition expressed by this Inequality (1) defines a preferred range of the ratio of the interval L_STO on the optical axis between the object-side surface of the lens L1A1 and the aperture stop A to the interval LL on the optical axis between the object-side surface of the lens L1A1 and the image-side surface of the lens L3E.

If the L_STO/LL ratio were equal to or less than the lower limit value defined by this Inequality (1), then the aperture stop A would be so close to the object-side end of the imaging optical system as to cause a significant increase in exit pupil length, thus making the lens diameter of either the second lens group G2 or the third lens group G3 too large.

On the other hand, if the L_STO/LL ratio were equal to or greater than the upper limit value defined by this Inequality (1), then the aperture stop A would be so distant from the object-side end of the imaging optical system as to cause an excessive increase in the lens diameter of the lens L1A1.

To enhance the advantage described above, at least one of the conditions expressed by the following Inequalities (1a) and (1b) is preferably satisfied:

$$0.15 < L\_STO/LL \quad (1a)$$

$$L\_STO/LL < 0.50 \quad (1b).$$

More preferably, to further enhance the advantage described above, at least one of the conditions expressed by the following Inequalities (1c) and (1d) may be satisfied:

$$0.20 < L\_STO/LL \quad (1c)$$

$$L\_STO/LL < 0.45 \quad (1d).$$

The imaging optical system having the basic configuration preferably satisfies the condition expressed by the following Inequality (2):

$$2.0 < LL/Y < 10.0 \quad (2)$$

where Y is an image height of the imaging optical system in an infinity in-focus state. Note that the units of these parameters should be the same (e.g., the units of LL and Y are both millimeters).

The condition expressed by this Inequality (2) defines a preferred range of the ratio of the interval LL on the optical axis between the object-side surface of the lens L1A1 and the image-side surface of the lens L3E to the image height Y of the imaging optical system in the infinity in-focus state.

If the LL/Y ratio were equal to or less than the lower limit value defined by this Inequality (2), then the overall length of the imaging optical system would be too short to arrange the respective lenses and the air gaps appropriately, thus making it difficult to enhance the performance.

On the other hand, if the LL/Y ratio were equal to or greater than the upper limit value defined by this Inequality (2), then the overall length of the imaging optical system would be too long.

To enhance the advantage described above, at least one of the conditions expressed by the following Inequalities (2a) and (2b) is preferably satisfied:

$$3.0 < LL/Y \quad (2a)$$

$$LL/Y < 7.0 \quad (2b).$$

More preferably, to further enhance the advantage described above, at least one of the conditions expressed by the following Inequalities (2c) and (2d) may be satisfied:

$$3.5 < LL/Y \quad (2c)$$

$$LL/Y < 5.0 \quad (2d).$$

The imaging optical system having the basic configuration preferably satisfies the condition expressed by the following Inequality (3):

$$0.1 < TG3A/TL3E < 20 \quad (3)$$

where TG3A is a maximum value of an air gap on the optical axis within the third lens group G3, and TL3E is a thickness on the optical axis of the lens L3E.

The condition expressed by this Inequality (3) defines a preferred range of the ratio of the maximum value TG3A of an air gap on the optical axis within the third lens group G3 (i.e., the maximum one of the respective air gaps between adjacent lenses within the third lens group G3) to the thickness TL3E on the optical axis of the lens L3E.

If the TG3A/TL3E ratio were equal to or less than the lower limit value defined by this Inequality (3), then the maximum air gap within the third lens group G3 would be so narrow as to cause a significant increase in the power of the lenses in the third lens group G3, thus widening the astigmatic difference.

On the other hand, if the TG3A/TL3E ratio were equal to or greater than the upper limit value defined by the Inequality (3), then the maximum air gap within the third lens group G3 would be so wide as to make the overall length of the imaging optical system too long.

To enhance the advantage described above, at least one of the conditions expressed by the following Inequalities (3a) and (3b) is preferably satisfied:

$$0.2 < TG3A/TL3E \qquad (3a)$$

$$TG3A/TL3E < 15 \qquad (3b).$$

More preferably, to further enhance the advantage described above, at least one of the conditions expressed by the following Inequalities (3c) and (3d) may be satisfied:

$$0.45 < TG3A/TL3E \qquad (3c)$$

$$TG3A/TL3E < 12 \qquad (3b).$$

In the imaging optical system having the basic configuration described above, the lens L1A1 preferably has positive power.

This makes it easier to make correction to an excessive astigmatic difference.

The imaging optical system having the basic configuration preferably satisfies the condition expressed by the following Inequality (4):

$$|FL\_L3E/FL| < 7 \qquad (4)$$

where FL_L3E is a focal length of the lens L3E, and FL is a focal length of the entire imaging optical system. Note that the units of these parameters should be the same (e.g., the units of FL_L3E and FL are both millimeters).

The condition expressed by this Inequality (4) defines a preferred range of the ratio of the focal length FL_L3E of the lens L3E to the focal length FL of the entire imaging optical system.

If the FL_L3E/FL ratio were greater than the upper limit value defined by this Inequality (4), then the focal length of the lens L3E would increase too much to correct the field curvature sufficiently.

At least one of the conditions expressed by the following Inequalities (4a) and (4b) is preferably satisfied:

$$0.50 < |FL\_L3E/FL| \qquad (4a)$$

$$|FL\_L3E/FL| < 6 \qquad (4b).$$

The advantage described above would be enhanced by satisfying the condition expressed by this Inequality (4b). If the |FL_L3E/FL| ratio were equal to or less than the lower limit value defined by this Inequality (4a), the focal length of the lens L3E would decrease too much to avoid correcting the field curvature excessively.

More preferably, to further enhance the advantage described above, at least one of the conditions expressed by the following Inequalities (4c) and (4d) may be satisfied:

$$0.80 < |FL\_L3E/FL| \qquad (4c)$$

$$|FL\_L3E/FL| < 4 \qquad (4d).$$

In the imaging optical system having the basic configuration, the object-side surface of the lens L3E preferably has a concave surface shape. The imaging optical system preferably satisfies the condition expressed by following Inequality (5):

$$-1 < q < 4.5 \qquad (5)$$

where q is a shape factor of the lens L3E and is given by $$q = (RrL3E + RfL3E)/(RrL3E - RfL3E)$$

where RfL3E is a radius of curvature of the object-side surface of the lens L3E, and RrL3E is a radius of curvature of an image-side surface of the lens L3E. Note that the units of these parameters should be the same (e.g., the units of RfL3E and RrL3E are both millimeters).

The condition expressed by this Inequality (5) defines a preferred range of the shape factor of the lens L3E.

If the shape factor q were equal to or less than the lower limit value defined by this Inequality (5), then the effect of correcting the field curvature of the lens L3E would increase too much to correct its field curvature moderately.

On the other hand, if the shape factor q were equal to or greater than the upper limit value defined by this Inequality (5), then the effect of correcting the field curvature of the lens L3E would decrease too much to correct its field curvature sufficiently.

To enhance the advantage described above, at least one of the conditions expressed by the following Inequalities (5a) and (5b) is preferably satisfied:

$$-0.8 < q \qquad (5a)$$

$$q < 4 \qquad (5b).$$

More preferably, to further enhance the advantage described above, at least one of the conditions expressed by the following Inequalities (5c) and (5d) may be satisfied:

$$-0.6 < q \qquad (5c)$$

$$q < 3 \qquad (5d).$$

In the imaging optical system having the basic configuration described above, at least one of an image-side surface or an object-side surface is preferably convex toward the aperture stop A. The image-side surface is a surface of a lens located adjacent to, and closer to the object than, the aperture stop A. The object-side surface is a surface of a lens located adjacent to, and closer to the image than, the aperture stop A. This enables widening the interval around an effective diameter between the lenses, thus making it easier to place the aperture stop A. In FIG. 1, the lens located adjacent to, and closer to the object than, the aperture stop A is the fourth lens L4. Also, in FIG. 1, the lens located adjacent to, and closer to the image than, the aperture stop A is the fifth lens L5.

In the imaging optical system having the basic configuration described above, all positive lenses (i.e., lenses having positive power) and all negative lenses (i.e., lens having negative power) included in the third lens group G3 preferably satisfy the condition expressed by the following Inequality (6):

$$0.25 < TG3P/TG3M < 20 \qquad (6)$$

where TG3P is a sum of thicknesses on the optical axis of all positive lenses included in the third lens group G3, and TG3M is a sum of thicknesses on the optical axis of all negative lenses included in the third lens group G3. Note that the units of these parameters should be the same (e.g., the units of TG3P and TG3M are both millimeters).

The condition expressed by this Inequality (6) defines a preferred range of the ratio of the sum of thicknesses TG3P on the optical axis of all positive lenses included in the third lens group G3 to the sum of thicknesses TG3M on the optical axis of all negative lenses included in the third lens group G3.

If the TG3P/TG3M ratio were equal to or less than the lower limit value defined by this Inequality (6), then the sum of thicknesses of those lenses having positive power in the third lens group G3 would decrease too much to avoid correcting the field curvature excessively.

On the other hand, if the TG3P/TG3M ratio were equal to or greater than the upper limit value defined by this Inequality (6), then the sum of thicknesses of those lenses having positive power in the third lens group G3 would increase so much as to make the imaging optical system oversized.

To enhance the advantage described above, at least one of the conditions expressed by the following Inequalities (6a) and (6b) is preferably satisfied:

$$0.5 < TG3P/TG3M \tag{6a}$$

$$TG3P/TG3M < 15 \tag{6b}$$

More preferably, to further enhance the advantage described above, at least one of the conditions expressed by the following Inequalities (6c) and (6d) may be satisfied:

$$0.8 < TG3P/TG3M \tag{6c}$$

$$TG3P/TG3M < 13 \tag{6d}$$

The imaging optical system having the basic configuration described above preferably satisfies the condition expressed by the following Inequality (7):

$$0.05 < TSTO/Y < 0.5 \tag{7}$$

where TSTO is an interval on the optical axis between an image-side surface of a lens located adjacent to, and closer to the object than, the aperture stop A and an object-side surface of a lens located adjacent to, and closer to the image than, the aperture stop A, and Y is an image height of the imaging optical system in an infinity in-focus state. Note that the units of these parameters should be the same (e.g., the units of TSTO and Y are both millimeters).

The condition expressed by this Inequality (7) defines a preferred range of the ratio of the interval TSTO on the optical axis between the image-side surface of a lens located adjacent to, and closer to the object than, the aperture stop A and the object-side surface of a lens located adjacent to, and closer to the image than, the aperture stop A to the image height Y of the imaging optical system in the infinity in-focus state.

If the TSTO/Y ratio were equal to or less than the lower limit value defined by this Inequality (7), then the interval on the optical axis between two lenses that are arranged to interpose the aperture stop A between themselves would be too narrow to arrange the aperture stop A between the two lenses easily.

On the other hand, if the TSTO/Y ratio were equal to or greater than the upper limit value defined by this Inequality (7), then the interval on the optical axis between the two lenses that are arranged to interpose the aperture stop A between themselves would be so wide as to make the imaging optical system oversized.

To enhance the advantage described above, at least one of the conditions expressed by the following Inequalities (7a) and (7b) is preferably satisfied:

$$0.10 < TSTO/Y \tag{7a}$$

$$TSTO/Y < 0.45 \tag{7b}$$

More preferably, to further enhance the advantage described above, at least one of the conditions expressed by the following Inequalities (7c) and (7d) may be satisfied:

$$0.15 < TSTO/Y \tag{7c}$$

$$TSTO/Y < 0.40 \tag{7d}$$

In the imaging optical system having the basic configuration described above, the third lens group G3 is preferably made up of a lens L3E and a lens L3P, which are arranged in this order such that the lens L3E is located closer to the image than the lens L3P is. The lens L3P preferably has positive power.

This makes it easier to reduce the size of the third lens group G3.

In the imaging optical system having the basic configuration described above, an object-side surface of the lens L3E preferably has a concave surface shape.

This makes it easier to reduce field curvature.

In the imaging optical system having the basic configuration described above, the sub-lens group G1B preferably includes at least two lenses.

This makes it easier to correct spherical aberration.

In the imaging optical system having the basic configuration described above, the sub-lens group G1B preferably includes a lens L1BE having positive power. The lens L1BE is located closest to the image in the sub-lens group G1B.

This makes it easier to correct spherical aberration.

The imaging optical system having the basic configuration described above preferably satisfies the condition expressed by the following Inequality (8):

$$|NdL1BE - NdL2F| < 0.2 \tag{8}$$

where NdL1BE is a d-line refractive index of the lens L1BE, and NdL2F is a d-line refractive index of a lens L2F located closest to the object in the second lens group G2.

The condition expressed by this Inequality (8) defines a preferred range of the absolute value of the difference between the d-line refractive index NdL1BE of the lens L1BE and the d-line refractive index NdL2F of a lens L2F located closest to the object in the second lens group G2.

If the absolute value of the difference in their refractive index were equal to or greater than the upper limit value defined by this Inequality (8), then it would not be easy to correct the spherical aberration and comatic aberration in the infinity in-focus state.

To enhance the advantage described above, the condition expressed by the following Inequality (8a) is preferably satisfied:

$$|NdL1BE - NdL2F| < 0.1 \tag{8a}$$

More preferably, to further enhance the advantage described above, the condition expressed by the following Inequality (8b) may be satisfied:

$$|NdL1BE - NdL2F| < 0.01 \tag{8b}$$

The imaging optical system having the basic configuration described above preferably satisfies the condition expressed by the following Inequality (9):

$$0.3 < BF/Y < 3 \tag{9}$$

where BF is an interval on the optical axis between an image-side surface of the lens L3E and an image plane S, and Y is an image height of the imaging optical system in an infinity in-focus state. Note that the units of these parameters should be the same (e.g., the units of BF and Y are both millimeters).

The condition expressed by this Inequality (9) defines a preferred range of the ratio of the interval BF on the optical axis between an image-side surface of the lens L3E and the image plane S to the image height Y of the imaging optical system in the infinity in-focus state.

If the BF/Y ratio were equal to or less than the lower limit value defined by this Inequality (9), then the interval between the image-side surface of the lens L3E and the image plane S would be too narrow to easily place a member for coupling this imaging optical system to an image sensor to be disposed on the image plane S.

On the other hand, if the BF/Y ratio were equal to or greater than the upper limit value defined by this Inequality (9), then the interval between the image-side surface of the lens L3E and the image plane S would be so wide as to make the imaging optical system oversized.

To enhance the advantage described above, at least one of the conditions expressed by the following Inequalities (9a) and (9b) is preferably satisfied:

$0.5 < BF/Y$ (9a)

$BF/Y < 2.0$ (9b).

More preferably, to further enhance the advantage described above, at least one of the conditions expressed by the following Inequalities (9c) and (9d) may be satisfied:

$0.7 < BF/Y$ (9c)

$BF/Y < 1.2$ (9d).

Even more preferably, to further enhance the advantage described above, at least one of the conditions expressed by the following Inequalities (9e) and (9f) may be satisfied:

$0.75 < BF/Y$ (9e)

$BF/Y < 0.95$ (9f).

The imaging optical system having the basic configuration described above preferably satisfies the condition expressed by the following Inequality (10):

$0.3 < TFOC\_L3E/FL < 3$ (10)

where TFOC_L3E is an interval on the optical axis between an object-side surface of a lens L2F located closest to the object in the second lens group G2 and an image-side surface of the lens L3E when the imaging optical system is in an infinity in-focus state, and FL is a focal length of the entire imaging optical system. Note that the units of these parameters should be the same (e.g., the units of TFOC_L3E and FL are both millimeters).

The condition expressed by this Inequality (10) defines a preferred range of the ratio of the interval TFOC_L3E on the optical axis between the object-side surface of a lens L2F located closest to the object in the second lens group G2 and the image-side surface of the lens L3E when the imaging optical system is in an infinity in-focus state to the focal length FL of the entire imaging optical system.

If the TFOC_L3E/FL ratio were equal to or less than the lower limit value defined by this Inequality (10), then the magnitude of movement of the lenses that move during focusing would be so small as to make the shooting distance range too narrow to find a focus.

On the other hand, if the TFOC_L3E/FL ratio were equal to or greater than the upper limit value defined by this Inequality (10), then the magnitude of movement of the lenses that move during focusing would increase so much as to make the imaging optical system oversized.

To enhance the advantage described above, at least one of the conditions expressed by the following Inequalities (10a) and (10b) is preferably satisfied:

$0.5 < TFOC\_L3E/FL$ (10a)

$TFOC\_L3E/FL < 2$ (10b).

More preferably, to further enhance the advantage described above, at least one of the conditions expressed by the following Inequalities (10c) and (10d) may be satisfied:

$0.6 < TFOC\_L3E/FL$ (10c)

$TFOC\_L3E/FL < 1$ (10d).

The imaging optical system having the basic configuration described above preferably satisfies the condition expressed by the following Inequality (11):

$0.5 < TSTO\_L3E/FL < 6$ (11)

where TSTO_L3E is an interval on the optical axis between the aperture stop A and an image-side surface of the lens L3E, and FL is a focal length of the entire imaging optical system. Note that the units of these parameters should be the same (e.g., the units of TSTO_L3E and FL are both millimeters).

The condition expressed by this Inequality (11) defines a preferred range of the ratio of the interval TSTO_L3E on the optical axis between the aperture stop A and the image-side surface of the lens L3E to the focal length FL of the entire imaging optical system.

If the TSTO_L3E/FL ratio were equal to or less than the lower limit value defined by this Inequality (11), then the interval on the optical axis between the aperture stop A and the third lens group G3 would be so narrow and the magnitude of movement of the lenses that move during focusing would be so small as to make the shooting distance range too narrow to find a focus.

On the other hand, if the TSTO_L3E/FL ratio were equal to or greater than the upper limit value defined by this Inequality (11), then the interval on the optical axis between the aperture stop A and the third lens group G3 would be so wide as to make the imaging optical system oversized.

To enhance the advantage described above, at least one of the conditions expressed by the following Inequalities (11a) and (11b) is preferably satisfied:

$0.9 < TSTO\_L3E/FL$ (11a)

$TSTO\_L3E/FL < 5$ (11b).

More preferably, to further enhance the advantage described above, at least one of the conditions expressed by the following Inequalities (11c) and (11d) may be satisfied:

$1.3 < TSTO\_L3E/FL$ (11c)

$TSTO\_L3E/FL < 4$ (11d).

The imaging optical system having the basic configuration described above preferably satisfies the condition expressed by the following Inequality (12):

$0.2 < FL\_G1B/FL\_G1 < 5$ (12)

where FL_G1B is a focal length of the sub-lens group G1B, and FL_G1 is a focal length of the first lens group G1. Note that the units of these parameters should be the same (e.g., the units of FL_G1B and FL_G1 are both millimeters).

The condition expressed by this Inequality (12) defines a preferred range of the ratio of the focal length FL_G1B of the sub-lens group G1B to the focal length FL_G1 of the first lens group G1.

If the FL_G1B/FL_G1 ratio were equal to or less than the lower limit value defined by this Inequality (12), then the focal length FL_G1B of the sub-lens group G1B would be too short to correct the spherical aberration sufficiently.

On the other hand, if the FL_G1B/FL_G1 ratio were equal to or greater than the upper limit value defined by this Inequality (12), then the focal length FL_G1B of the sub-lens group G1B would be too long to avoid correcting the spherical aberration excessively.

To enhance the advantage described above, at least one of the conditions expressed by the following Inequalities (12a) and (12b) is preferably satisfied:

$$0.5 < FL\_G1B/FL\_G1 \tag{12a}$$

$$FL\_G1B/FL\_G1 < 4 \tag{12b}$$

More preferably, to further enhance the advantage described above, at least one of the conditions expressed by the following Inequalities (12c) and (12d) may be satisfied:

$$0.6 < FL\_G1B/FL\_G1 \tag{12c}$$

$$FL\_G1B/FL\_G1 < 2 \tag{12d}$$

The imaging optical system having the basic configuration described above preferably satisfies the condition expressed by the following Inequality (13):

$$0.1 < TG3/FL < 2 \tag{13}$$

where TG3 is an interval on the optical axis between a surface, located closest to the object, of the third lens group G3 and a surface, located closest to the image, of the third lens group G3, and FL is a focal length of the entire imaging optical system. Note that the units of these parameters should be the same (e.g., the units of TG3 and FL are both millimeters).

The condition expressed by this Inequality (13) defines a preferred range of the ratio of the interval TG3 on the optical axis between a surface, located closest to the object, of the third lens group G3 and a surface, located closest to the image, of the third lens group G3 to the focal length FL of the entire imaging optical system.

If the TG3/FL ratio were equal to or less than the lower limit value defined by this Inequality (13), then the interval on the optical axis between those surfaces of the third lens group G3 would be too narrow to easily avoid producing field curvature.

On the other hand, if the TG3/FL ratio were equal to or greater than the upper limit value defined by this Inequality (13), then the interval on the optical axis between those surfaces of the third lens group G3 would be so wide as to make the imaging optical system oversized.

To enhance the advantage described above, at least one of the conditions expressed by the following Inequalities (13a) and (13b) is preferably satisfied:

$$0.15 < TG3/FL \tag{13a}$$

$$TG3/FL < 1.4 \tag{13b}$$

More preferably, to further enhance the advantage described above, at least one of the conditions expressed by the following Inequalities (13c) and (13d) may be satisfied:

$$0.2 < TG3/FL \tag{13c}$$

$$TG3/FL < 0.8 \tag{13d}$$

In the imaging optical system having the basic configuration described above, while the imaging optical system is focusing to make a transition from an infinity in-focus state toward a close-object in-focus state, a surface, located closest to the object, of the second lens group G2 preferably moves toward the image. In FIG. 9, for example, the surface, located closest to the object, of the second lens group G2 is the object-side surface of the seventh lens L7.

This makes it easier to find a focus when the shooting distance has changed.

Also, the second lens group G2 is preferably made up of at most three lenses including the lens LFN.

This may reduce the number of lenses required for finding a focus, thus simplifying the focusing mechanism.

(Schematic Configuration for Image Capture Device to which First Embodiment is Applied)

Figure 11:
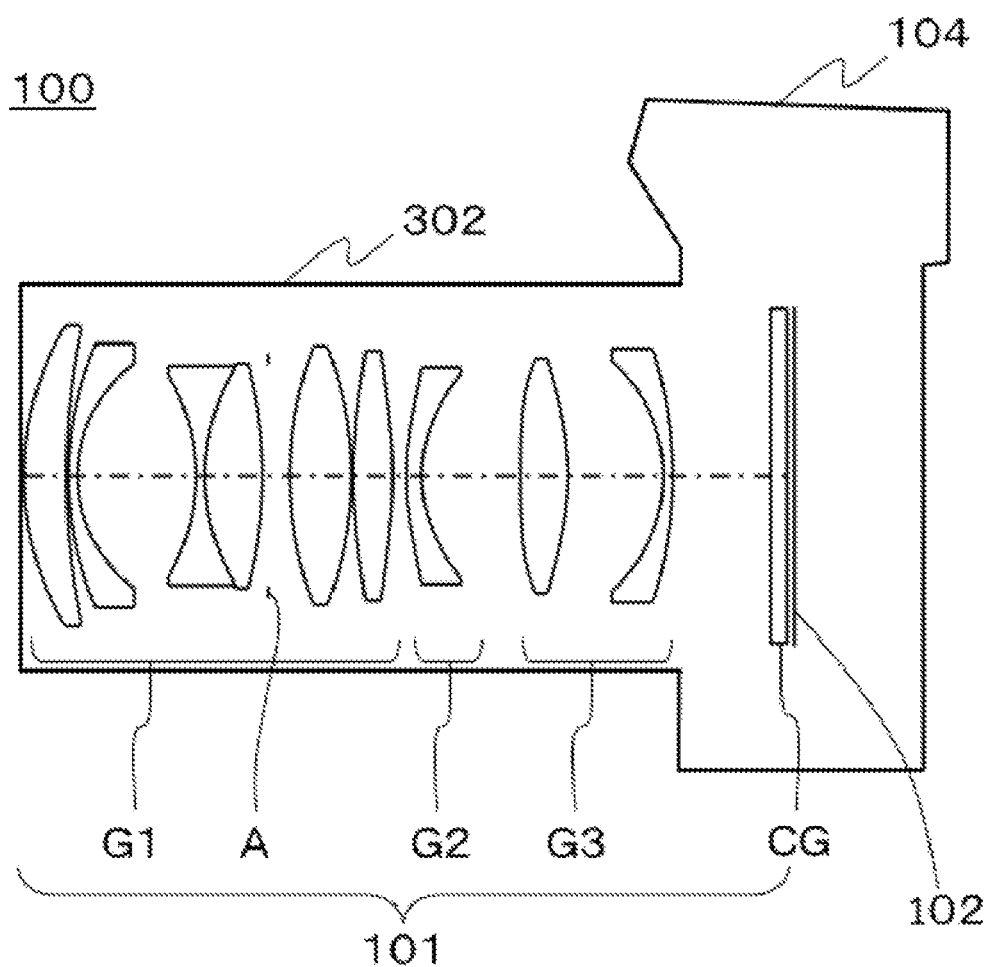
FIG. 11 illustrates a schematic configuration for a digital camera according to the first embodiment.

FIG. 11 illustrates a schematic configuration for an image capture device, to which the imaging optical system of the first embodiment is applied. Optionally, the imaging optical system according to the second, third, fourth, or fifth embodiment is also applicable to the image capture device.

The image capture device 100 includes a housing 104, an image sensor 102, and the imaging optical system 101 according to the first embodiment. Specifically, the image capture device 100 may be implemented as a digital camera, for example.

The housing 104 includes a lens barrel 302. The lens barrel 302 holds the respective lens groups and the aperture stop A that form the imaging optical system 101.

The image sensor 102 is disposed at the image plane S of the imaging optical system 101 according to the first embodiment.

The image capture device 100 transforms an optical image of an object into an electrical image signal and displays and/or stores the image signal thus transformed. The image capture device 100 may include, for example, at least one of a monitor on which the image signal is displayed or a memory to store the image signal.

The imaging optical system 101 forms an optical image of the object. The image sensor 102 transforms the optical image, formed by the imaging optical system 101, into an electrical image signal.

The imaging optical system 101 is configured such that an interval on the optical axis between a surface, located closest to the image, of the first lens group G1 and a surface, located closest to the object, of the second lens group G2 and an interval on the optical axis between a surface, located closest to the image, of the second lens group G2 and a surface, located closest to the object, of the third lens group G3 change. Specifically, to allow at least one lens having negative power (such as the seventh lens L7) in the second lens group G2 to move while the imaging optical system 101 is focusing, an actuator and a lens frame, which are included in the housing 104, are attached or coupled to the at least one lens having negative power.

This provides an image capture device 100 with the ability to compensate for various types of aberrations sufficiently.

In the example described above, the imaging optical system 101 according to the first embodiment is applied to a digital camera. However, this is only an example and should not be construed as limiting. Alternatively, the imaging optical system is also applicable to a surveillance camera, a smartphone, or any of various other types of image capture devices.

(Schematic Configuration for Camera System to which First Embodiment is Applied)

Figure 12:
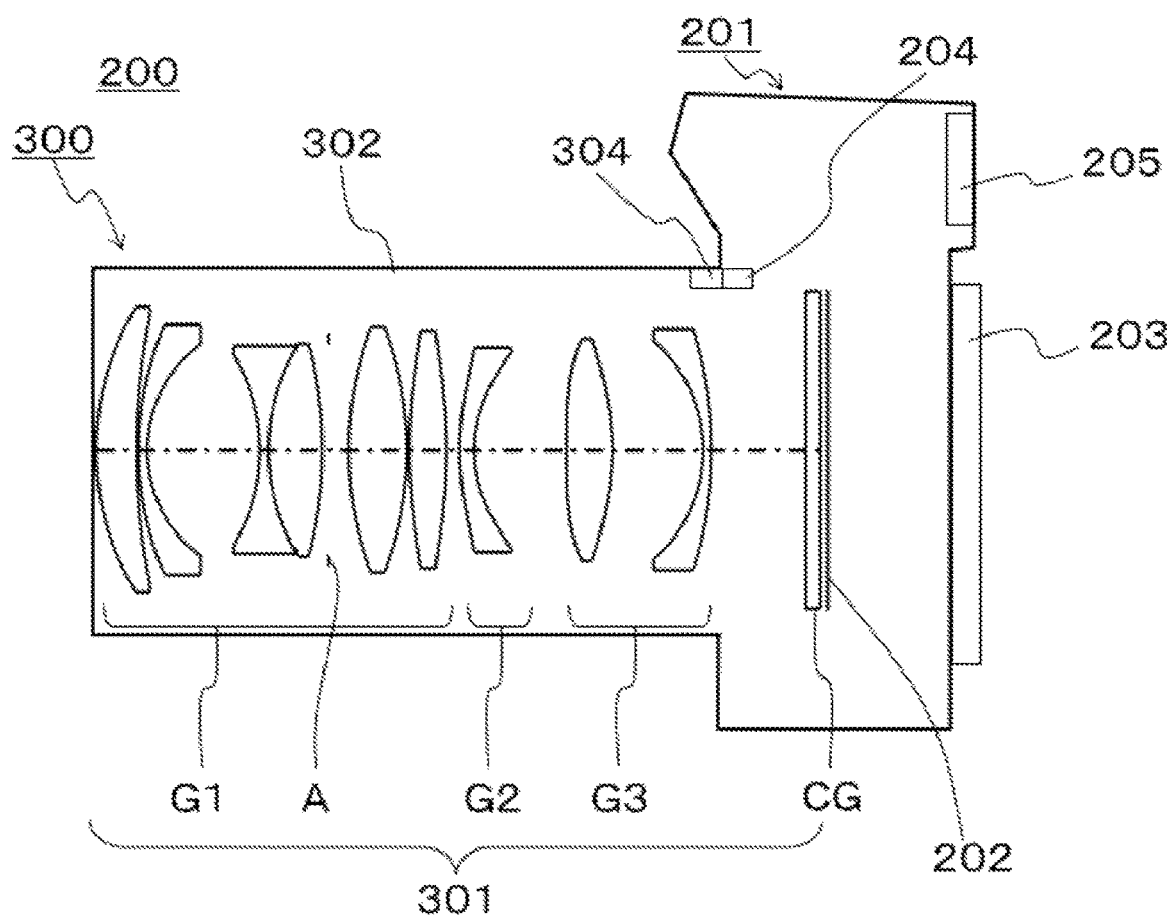
FIG. 12 illustrates a schematic configuration for a lens interchangeable digital camera system according to the first embodiment.

FIG. 12 illustrates a schematic configuration for a camera system, to which the imaging optical system of the first embodiment is applied. Alternatively, the imaging optical system according to the second, third, fourth, or fifth embodiment is also applicable to the camera system.

The camera system 200 includes a camera body 201 and an interchangeable lens unit 300 to be connected removably to the camera body 201.

The camera body 201 includes an image sensor 202, a monitor 203, a memory, a camera mount 204, and a viewfinder 205. The image sensor 202 receives an optical image formed by the imaging optical system 301 of the interchangeable lens unit 300 and transforms the optical image into an electrical image signal. The monitor 203 displays the image signal transformed by the image sensor 202. The memory stores the image signal.

The imaging optical system 301 of the interchangeable lens unit 300 is the imaging optical system according to the first embodiment. The interchangeable lens unit 300 makes the imaging optical system 301 form an optical image of the object on the image sensor 202.

The interchangeable lens unit 300 includes not only the imaging optical system 301 but also a lens barrel 302 and a lens mount 304. The lens barrel 302 holds the respective lens groups and aperture stop A of the imaging optical system 301. The lens mount 304 is configured to be connected removably to the camera mount 204 of the camera body 201.

In this manner, the camera mount 204 and the lens mount 304 are physically connected together. In addition, the camera mount 204 and the lens mount 304 also electrically connect together a controller in the camera body 201 and a controller in the interchangeable lens unit 300. That is to say, the camera mount 204 and the lens mount 304 also serve as interfaces that allow themselves to exchange signals with each other.

The imaging optical system 301 includes the respective lens groups held by the lens barrel 302 and cover glass CG of the camera body 201. The imaging optical system 301 includes the first lens group G1, the second lens group G2, the aperture stop A, and the third lens group G3. The imaging optical system 301 is configured such that an interval on the optical axis between a surface, located closest to the image, of the first lens group G1 and a surface, located closest to the object, of the second lens group G2 and an interval on the optical axis between a surface, located closest to the image, of the second lens group G2 and a surface, located closest to the object, of the third lens group G3 change. Specifically, to allow at least one lens having negative power (such as the seventh lens L7) in the second lens group G2 to move while the imaging optical system 301 is focusing, an actuator and a lens frame, which are controlled by the controller in the interchangeable lens unit 300, are arranged.

Other Embodiments

The first, second, third, fourth, and fifth embodiments have been described as exemplary embodiments of the present disclosure. Note that the embodiments described above are only examples of the present disclosure and should not be construed as limiting. Rather, each of those embodiments may be readily modified, replaced, combined with other embodiments, provided with some additional components, or partially omitted without departing from the scope of the present disclosure.

In the first to third embodiments described above, the seventh lens L7 that is a single lens has been described as an example of the second lens group G2 and the lens LFN. The second lens group G2 may be configured to allow at least one lens LFN having negative power in the second lens group G2 to move along the optical axis such that an interval on the optical axis between a surface, located closest to an image, of the first lens group G1 and a surface, located closest to the object, of the second lens group G2 and an interval on the optical axis between a surface, located closest to the image, of the second lens group G2 and a surface, located closest to the object, of the third lens group G3 change with respect to the first lens group G1 and the third lens group G3 that do not move during focusing. Thus, the second lens group G2 and the lens LFN are not limited to a single lens.

Alternatively, as described for the fourth embodiment, the second lens group G2 includes, as a lens LFN, the ninth lens L9 having negative power. The second lens group G2 may include the seventh lens L7 as a single lens and a bonded lens formed by the eighth lens L8 and the ninth lens L9. The second lens group G2 may be configured to move in its entirety during focusing. Alternatively, the second lens group G2 may also consist of only a bonded lens which is configured to move during focusing. If an increase in the load on the focus actuator is permissible due to an increase in the weight of the lenses, setting the number of lenses that move during focusing at two or more enables compensating for various aberrations of the imaging optical system (e.g., the field curvature in the infinity in-focus state and close-object in-focus state, among other things) sufficiently.

In addition, as already described for the fifth embodiment, for example, the second lens group G2 may also be configured such that the sub-lens group G2A moves toward the image and the sub-lens group G2B moves toward the object while the imaging optical system is focusing to make a transition from the infinity in-focus state toward the close-object in-focus state. Furthermore, the sub-lens group G2A or the sub-lens group G2B does not have to be a single lens but may also be a bonded lens. Alternatively, the sub-lens group G2A or the sub-lens group G2B may also be a group including two or more single lenses that move together. Still alternatively, the sub-lens group G2A or the sub-lens group G2B may also be a combination of a single lens and a bonded lens that move together. Yet alternatively, the second lens group G2 may include, between the sub-lens group G2A and the sub-lens group G2B, at least one lens that does not move during focusing. This makes it easier to reduce the magnitude of focus shift and variation in aberration during focusing. In addition, allowing the increase in the number of focus actuators as described above enables compensating for various aberrations of the imaging optical system (e.g., the field curvature in the infinity in-focus state and close-object in-focus state, among other things).

In the first to fifth embodiments described above, each of the lens groups that form the imaging optical system is supposed to consist of only refractive lenses that deflect the incoming light ray through refraction (i.e., lenses of the type that deflect the incoming light ray at the interface between two media with mutually different refractive indices). However, this is only an example and should not be construed as limiting. Alternatively, each lens group may also include diffractive lenses that deflect the incoming light ray through diffraction, refractive-diffractive hybrid lenses that deflect the incoming light ray through a combination of diffraction and refraction, or refractive index distributed lenses that deflect the incoming light ray in accordance with the distribution of refractive indices in the medium, or a combination of two or more types of these lenses. Among other things, a diffraction structure is suitably formed at the interface between two media with mutually different refractive indices in the refractive-diffractive hybrid lenses, because the diffraction efficiency would depend on the wavelength much less heavily in that case. This provides a camera system in which various types of aberrations have been compensated for sufficiently.

(Examples of Numerical Values)

Next, exemplary sets of specific numerical values that were actually adopted in the imaging optical systems with the configurations according to the first, second, third, fourth, and fifth embodiments will be described. Note that in the tables showing these exemplary sets of numerical values, the length is expressed in millimeters (mm), the angle of view is expressed in degrees (°), r indicates the radius of curvature, d indicates the surface interval, nd indicates a refractive index with respect to a d-line, υd (also denoted as "vd") indicates an abbe number with respect to a d-line, and a surface with an asterisk (*) is an aspheric surface. The aspheric shape is defined by the following Equation (1):

$$Z = \frac{h^2/r}{1 + \sqrt{1 - (1+\kappa)(h/r)^2}} + \sum A_n h^n$$

where Z is the distance from a point on an aspheric surface, located at a height h as measured from the optical axis, to a tangent plane defined with respect to the vertex of the aspheric surface, h is the height as measured from the optical axis, r is the radius of curvature of the vertex, κ is a conic constant, and An is an $n^{th}$ order aspheric surface coefficient.

FIGS. 2, 4, 6, 8, and 10 are longitudinal aberration diagrams showing what state the imaging optical systems according to the first, second, third, fourth, and fifth examples of numerical values assume.

In each longitudinal aberration diagram, portion (a) shows the longitudinal aberrations at the infinity focus point, and portion (b) shows the longitudinal aberrations at the close-object focus point. Each of portions (a) and (b) of these longitudinal aberration diagrams shows spherical aberration (SA (mm)), astigmatism (AST (mm)), and distortion (DIS (%)) in this order from left to right. In each spherical aberration diagram, the ordinate indicates the F number (designated by "F" on the drawings), the solid curve indicates a characteristic in response to a d-line, the shorter dashed curve indicates a characteristic in response to an F-line, and the longer dashed curve indicates a characteristic in response to a C-line. In each astigmatism diagram, the ordinate indicates the image height (designated by "H" on the drawings), the solid curve indicates a characteristic with respect to a sagittal plane (designated by "s" on the drawings), and the dotted curve indicates a characteristic with respect to a meridional plane (designated by "m" on the drawings). Furthermore, in each distortion diagram, the ordinate indicates the image height (designated by "H" on the drawings).

(First Example of Numerical Values)

Following is a first exemplary set of numerical values for the imaging optical system corresponding to the first embodiment shown in FIG. 1. Specifically, as the first example of numerical values for the imaging optical system, surface data is shown in Table 1A, aspheric surface data is shown in Table 1B, various types of data in the infinity in-focus state and close-object in-focus state are shown in Table 1C, data about single lenses is shown in Table 1D, data about lens groups in the infinity in-focus state is shown in Table 1E, zoom powers of lens groups in the infinity in-focus state and close-object in-focus state are shown in Table 1F, and data about sub-lens groups is shown in Table 1G.

TABLE 1A (Surface data)

| Surface No. | r | d | nd | vd |
|---|---|---|---|---|
| 0 (object surface) | ∞ | Variable | | |
| 1 | 38.42740 | 5.52300 | 1.85996 | 30.5 |
| 2 | 94.19390 | 0.30000 | | |
| 3 | 43.21060 | 1.20000 | 1.49700 | 81.6 |
| 4 | 18.21170 | 15.51010 | | |
| 5 | −25.82130 | 1.20000 | 1.65794 | 31.1 |
| 6 | 27.15660 | 0.01000 | 1.56732 | 42.8 |
| 7 | 27.15660 | 7.53000 | 1.59269 | 65.3 |
| 8 | −56.61760 | 0.73800 | | |
| 9 (aperture) | ∞ | 2.87000 | | |
| 10 | 48.08490 | 8.04450 | 1.59282 | 68.6 |
| 11 | −47.17840 | 0.30000 | | |
| 12* | 72.83460 | 5.11150 | 1.51570 | 55.8 |
| 13* | −66.26290 | Variable | | |
| 14* | 33.70070 | 2.00000 | 1.51607 | 56.3 |
| 15* | 16.81800 | Variable | | |
| 16* | 286.14730 | 6.26580 | 1.51570 | 55.8 |
| 17* | −34.83520 | 12.50120 | | |
| 18 | −20.12450 | 1.20000 | 1.54157 | 51.7 |
| 19 | −54.83640 | 12.90000 | | |
| 20 | ∞ | 2.10000 | 1.51680 | 64.2 |
| 21 | ∞ | 1.00000 | | |
| Image plane | ∞ | | | |

TABLE 1B (Aspheric surface data)

$12^{th}$ surface
K = 0.00000E+00, A4 = −4.36516E−06, A6 = 4.27940E−09,
A8 = −1.31680E−11, A10 = −1.14476E−15
$13^{th}$ surface
K = 0.00000E+00, A4 = 8.55335E−06, A6 = −3.38027E−09,
A8 = 0.00000E+00, A10 = 0.00000E+00
$14^{th}$ surface
K = 0.00000E+00, A4 = −3.20814E−05, A6 = 3.04040E−08,
A8 = −9.83934E−12, A10 = 0.00000E+00
$15^{th}$ surface
K = −1.42129E+00, A4 = −2.12498E−08, A6 = 8.60734E−09,
A8 = 2.95476E−11, A10 = 0.00000E+00
$16^{th}$ surface
K = 0.00000E+00, A4 = 3.35290E−05, A6 = −1.49631E−08,
A8 = −2.39445E−12, A10 = 0.00000E+00
$17^{th}$ surface
K = 0.00000E+00, A4 = 1.74131E−05, A6 = −1.58208E−08,
A8 = 3.47625E−11, A10 = −1.23868E−13

TABLE 1C (Various types of data in infinity in-focus state and close-object in-focus state)

| | Infinity | Close-object |
|---|---|---|
| Focal length | 48.2535 | 43.6130 |
| F number | 1.86017 | 1.91036 |
| Angle of view | 24.1432 | 23.1170 |
| Image height | 21.3629 | 21.6300 |
| Total lens length | 101.0000 | 101.0000 |
| d0 | ∞ | 349.0000 |
| d13 | 1.8000 | 6.6163 |
| d15 | 12.8959 | 8.0795 |
| Entrance pupil position | 29.4626 | 29.4626 |

TABLE 1C-continued (Various types of data in infinity in-focus state and close-object in-focus state)

| | Infinity | Close-object |
|---|---|---|
| Exit pupil position | −49.2742 | −47.6344 |
| Anterior principal point | 30.4699 | 27.7515 |
| Posterior principal point | 52.7546 | 51.7192 |

TABLE 1D (Data about single lenses)

| Lens | Start surface | Focal length |
|---|---|---|
| 1 | 1 | 72.1722 |
| 2 | 3 | −64.3640 |
| 3 | 5 | −19.9382 |
| 4 | 7 | 32.0381 |
| 5 | 10 | 41.4733 |
| 6 | 12 | 68.1328 |
| 7 | 14 | −67.7858 |
| 8 | 16 | 60.6211 |
| 9 | 18 | −59.4247 |

TABLE 1E (Data about lens groups in infinity in-focus state)

| Group | Start surface | Focal length | Lens configuration length | Anterior principal point | Posterior principal point |
|---|---|---|---|---|---|
| 1 | 1 | 34.75504 | 48.33710 | 40.47156 | 49.68522 |
| 2 | 14 | −67.78580 | 2.00000 | 2.74400 | 3.36936 |
| 3 | 16 | 318.80580 | 19.96700 | −63.32946 | −46.99420 |

TABLE 1F (Zoom powers of lens groups in infinity in-focus state and close-object in-focus state)

| Group | Start surface | Infinity | Close-object |
|---|---|---|---|
| 1 | 1 | 0.00000 | −0.09798 |
| 2 | 14 | 1.87116 | 1.80101 |
| 3 | 16 | 0.74199 | 0.74189 |

TABLE 1G (Data about sub-lens groups)

| Group | Start surface | Focal length | Lens configuration length |
|---|---|---|---|
| 1A | 1 | −67.64731 | 31.27312 |
| 1B | 10 | 26.92788 | 13.45593 |

(Second Example of Numerical Values)

Following is a second exemplary set of numerical values for the imaging optical system corresponding to the second embodiment shown in FIG. 3. Specifically, as the second example of numerical values for the imaging optical system, surface data is shown in Table 2A, aspheric surface data is shown in Table 2B, various types of data in the infinity in-focus state and close-object in-focus state are shown in Table 2C, data about single lenses is shown in Table 2D, data about lens groups in the infinity in-focus state is shown in Table 2E, zoom powers of lens groups in the infinity in-focus state and close-object in-focus state are shown in Table 2F, and data about sub-lens groups is shown in Table 2G.

TABLE 2A (Surface data)

| Surface No. | r | d | nd | Vd |
|---|---|---|---|---|
| 0 (object surface) | ∞ | Variable | | |
| 1 | 57.56070 | 2.54360 | 1.99900 | 18.0 |
| 2 | 73.66890 | 0.30000 | | |
| 3 | 29.97440 | 1.20000 | 1.49700 | 81.6 |
| 4 | 20.75620 | 8.65050 | | |
| 5 | −26.23400 | 1.20000 | 1.65166 | 30.6 |
| 6 | 35.19010 | 0.01000 | 1.56732 | 42.8 |
| 7 | 35.19010 | 5.35790 | 1.64068 | 60.6 |
| 8 | −285.35080 | 0.73800 | | |
| 9 (aperture) | ∞ | 2.87000 | | |
| 10 | 69.05930 | 9.80660 | 1.59788 | 64.7 |
| 11 | −44.57610 | 0.99990 | | |
| 12* | 43.16250 | 7.64130 | 1.51570 | 55.8 |
| 13* | −65.81240 | Variable | | |
| 14* | 24.13330 | 2.18480 | 1.51607 | 56.3 |
| 15* | 15.75700 | Variable | | |
| 16* | 532.37770 | 7.40260 | 1.51570 | 55.8 |
| 17* | −34.64130 | 13.57170 | | |
| 18 | −23.01700 | 1.88650 | 1.85057 | 20.8 |
| 19 | −52.43680 | 13.34190 | | |
| 20 | ∞ | 2.10000 | 1.51680 | 64.2 |
| 21 | ∞ | 1.00000 | | |
| Image plane | ∞ | | | |

TABLE 2B (Aspheric surface data)

$12^{th}$ surface
K = 0.00000E+00, A4 = −1.55697E−06, A6 = 8.96331E−09, A8 = 1.85826E−13, A10 = 4.31685E−15
$13^{th}$ surface
K = 0.00000E+00, A4 = 9.78416E−06, A6 = 6.08302E−09, A8 = 0.00000E+00, A10 = 0.00000E+00
$14^{th}$ surface
K = 0.00000E+00, A4 = −3.15483E−05, A6 = −2.40821E−09, A8 = −7.41270E−12, A10 = 0.00000E+00
$15^{th}$ surface
K = −1.42129E+00, A4 = 4.29968E−06, A6 = −1.56481E−08, A8 = 2.83556E−11, A10 = 0.00000E+00
$16^{th}$ surface
K = 0.00000E+00, A4 = 2.68728E−05, A6 = −7.77296E−09, A8 = 9.37812E−12, A10 = 0.00000E+00
$17^{th}$ surface
K = 0.00000E+00, A4 = 1.45815E−05, A6 = −9.83640E−09, A8 = 2.93509E−11, A10 = −2.74094E−14

TABLE 2C (Various types of data in infinity in-focus state and close-object in-focus state)

| | Infinity | Close-object |
|---|---|---|
| Focal length | 48.8914 | 43.9759 |
| F number | 1.83100 | 1.85293 |
| Angle of view | 23.8296 | 22.9803 |
| Image height | 20.7445 | 21.0094 |
| Total lens length | 100.9999 | 100.9999 |
| d0 | ∞ | 349.0010 |
| d13 | 1.8000 | 8.2734 |
| d15 | 16.3945 | 9.9211 |
| Entrance pupil position | 15.9492 | 15.9492 |
| Exit pupil position | −52.5306 | −50.8265 |
| Anterior principal point | 19.2618 | 16.8076 |
| Posterior principal point | 52.0226 | 51.0489 |

TABLE 2D (Data about single lenses)

| Lens | Start surface | Focal length |
|---|---|---|
| 1 | 1 | 244.2364 |
| 2 | 3 | −141.9337 |
| 3 | 5 | −22.8872 |
| 4 | 7 | 49.2173 |
| 5 | 10 | 46.8223 |
| 6 | 12 | 51.7818 |
| 7 | 14 | −96.5405 |
| 8 | 16 | 63.3509 |
| 9 | 18 | −49.6967 |

TABLE 2E (Data about lens groups in infinity in-focus state)

| Group | Start surface | Focal length | Lens configuration length | Anterior principal point | Posterior principal point |
|---|---|---|---|---|---|
| 1 | 1 | 37.30850 | 41.31780 | 31.95023 | 48.16469 |
| 2 | 14 | −96.54048 | 2.18480 | 4.55656 | 5.15985 |
| 3 | 16 | −5207.58806 | 22.86080 | 1372.04384 | 1093.69861 |

TABLE 2F (Zoom powers of lens groups in infinity in-focus state and close-object in-focus state)

| Group | Start surface | Infinity | Close-object |
|---|---|---|---|
| 1 | 1 | 0.00000 | −0.10857 |
| 2 | 14 | 1.64348 | 1.57837 |
| 3 | 16 | 0.79737 | 0.79740 |

TABLE 2G (Data about sub-lens groups)

| Group | Start surface | Focal length | Lens configuration length |
|---|---|---|---|
| 1A | 1 | −39.98984 | 19.26200 |
| 1B | 10 | 26.05053 | 18.44779 |

(Third Example of Numerical Values)

Following is a third exemplary set of numerical values for the imaging optical system corresponding to the third embodiment shown in FIG. 5. Specifically, as the third example of numerical values for the imaging optical system, surface data is shown in Table 3A, aspheric surface data is shown in Table 3B, various types of data in the infinity in-focus state and close-object in-focus state are shown in Table 3C, data about single lenses is shown in Table 3D, data about lens groups in the infinity in-focus state is shown in Table 3E, zoom powers of lens groups in the infinity in-focus state and close-object in-focus state are shown in Table 3F, and data about sub-lens groups is shown in Table 3G.

TABLE 3A (Surface data)

| Surface No. | r | d | nd | Vd |
|---|---|---|---|---|
| 0 (object surface) | ∞ | Variable | | |
| 1 | 36.80330 | 5.54500 | 1.85825 | 30.8 |
| 2 | 86.39570 | 0.30000 | | |
| 3 | 46.92960 | 1.20000 | 1.49700 | 81.6 |
| 4 | 18.13980 | 15.57210 | | |
| 5 | −25.78050 | 1.20000 | 1.63816 | 31.9 |
| 6 | 26.68960 | 0.01000 | 1.56732 | 42.8 |
| 7 | 26.68960 | 7.53000 | 1.60063 | 64.4 |
| 8 | −49.63780 | 0.73800 | | |
| 9 (aperture) | ∞ | 2.87000 | | |
| 10 | 40.93470 | 8.40880 | 1.59282 | 68.6 |
| 11 | −49.08610 | 0.30000 | | |
| 12* | 77.80870 | 4.05560 | 1.51570 | 55.8 |
| 13* | −148.21700 | Variable | | |
| 14* | 51.39300 | 2.00000 | 1.51607 | 56.3 |
| 15* | 21.93840 | Variable | | |
| 16* | 1484.47290 | 5.60210 | 1.51570 | 55.8 |
| 17* | −39.64080 | 5.66730 | | |
| 18 | 237.74480 | 2.58230 | 1.81281 | 42.8 |
| 19 | −511.55690 | 5.64460 | | |
| 20 | −20.60640 | 1.20000 | 1.53265 | 55.5 |
| 21 | −71.04900 | 12.90000 | | |
| 22 | ∞ | 2.10000 | 1.51680 | 64.2 |
| 23 | ∞ | 1.00000 | | |
| Image plane | ∞ | | | |

TABLE 3B (Aspheric surface data)

$12^{th}$ surface
K = 0.00000E+00, A4 = 8.30117E−06, A6 = 3.75330E−08,
A8 = 6.41432E−11, A10 = −2.10862E−13
$13^{th}$ surface
K = 0.00000E+00, A4 = 2.22564E−05, A6 = 5.27589E−08,
A8 = 0.00000E+00, A10 = 0.00000E+00
$14^{th}$ surface
K = 0.00000E+00, A4 = 5.65185E−06, A6 = −9.83708E−08,
A8 = 2.08923E−10, A10 = 0.00000E+00
$15^{th}$ surface
K = −1.42129E+00, A4 = 2.96720E−05, A6 = −1.28984E−07,
A8 = 2.84244E−10, A10 = 0.00000E+00
$16^{th}$ surface
K = 0.00000E+00, A4 = 3.66775E−05, A6 = −1.59762E−08,
A8 = −6.65434E−12, A10 = 0.00000E+00
$17^{th}$ surface
K = 0.00000E+00, A4 = 1.83234E−05, A6 = −1.96132E−08,
A8 = 4.85705E−11, A10 = −1.88164E−13

TABLE 3C (Various types of data in infinity in-focus state and close-object in-focus state)

| | Infinity | Close-object |
|---|---|---|
| Focal length | 48.2530 | 43.7094 |
| F number | 1.86015 | 1.91602 |
| Angle of view | 24.1429 | 23.0347 |
| Image height | 21.3216 | 21.6212 |
| Total lens length | 101.0001 | 101.0001 |
| d0 | ∞ | 349.0010 |
| d13 | 1.8000 | 7.4678 |
| d15 | 12.7743 | 7.1064 |
| Entrance pupil position | 29.3679 | 29.3679 |
| Exit pupil position | −49.3899 | −47.6162 |
| Anterior principal point | 30.4966 | 27.5111 |
| Posterior principal point | 52.7660 | 51.6028 |

TABLE 3D (Data about single lenses)

| Lens | Start surface | Focal length |
|---|---|---|
| 1 | 1 | 71.0364 |
| 2 | 3 | −60.3307 |
| 3 | 5 | −20.3678 |
| 4 | 7 | 30.0087 |
| 5 | 10 | 39.0076 |
| 6 | 12 | 99.5476 |
| 7 | 14 | −75.9282 |
| 8 | 16 | 74.9624 |
| 9 | 18 | 200.0001 |
| 10 | 20 | −54.9451 |

TABLE 3E (Data about lens groups in infinity in-focus state)

| Group | Start surface | Focal length | Lens configuration length | Anterior principal point | Posterior principal point |
|---|---|---|---|---|---|
| 1 | 1 | 36.49226 | 47.72950 | 39.44141 | 48.24180 |
| 2 | 14 | −75.92820 | 2.00000 | 2.35623 | 3.00582 |
| 3 | 16 | 304.07442 | 20.69630 | −55.10671 | −39.94874 |

TABLE 3F (Zoom powers of lens groups in infinity in-focus state and close-object in-focus state)

| Group | Start surface | Infinity | Close-object |
|---|---|---|---|
| 1 | 1 | 0.00000 | −0.10369 |
| 2 | 14 | 1.76250 | 1.68865 |
| 3 | 16 | 0.75023 | 0.75012 |

TABLE 3G (Data about sub-lens groups)

| Group | Start surface | Focal length | Lens configuration length |
|---|---|---|---|
| 1A | 1 | −81.23 | 31.35700 |
| 1B | 10 | 28.90376 | 12.76437 |

(Fourth Example of Numerical Values)

Following is a fourth exemplary set of numerical values for the imaging optical system corresponding to the fourth embodiment shown in FIG. 7. Specifically, as the fourth example of numerical values for the imaging optical system, surface data is shown in Table 4A, aspheric surface data is shown in Table 4B, various types of data in the infinity in-focus state and close-object in-focus state are shown in Table 4C, data about single lenses is shown in Table 4D, data about lens groups in the infinity in-focus state is shown in Table 4E, zoom powers of lens groups in the infinity in-focus state and close-object in-focus state are shown in Table 4F, and data about sub-lens groups is shown in Table 4G.

TABLE 4A (Surface data)

| Surface No. | r | d | nd | Vd |
|---|---|---|---|---|
| 0 (object surface) | ∞ | Variable | | |
| 1 | 29.39070 | 5.60400 | 1.89146 | 25.9 |
| 2 | 61.19300 | 0.30000 | | |
| 3 | 48.48210 | 1.20000 | 1.56786 | 43.5 |
| 4 | 17.04940 | 12.60990 | | |
| 5 | −24.34420 | 1.22250 | 1.66002 | 29.8 |
| 6 | 24.60200 | 0.01000 | 1.56732 | 42.8 |
| 7 | 24.60200 | 7.53000 | 1.63367 | 61.2 |
| 8 | −61.79990 | 0.73800 | | |
| 9 (aperture) | ∞ | 2.87000 | | |
| 10 | 56.13210 | 6.84020 | 1.59282 | 68.6 |
| 11 | −56.43950 | 0.30000 | | |
| 12* | 94.09000 | 6.07110 | 1.51570 | 55.8 |
| 13* | −41.15660 | Variable | | |
| 14 | −90.82290 | 2.80600 | 1.51570 | 55.8 |
| 15* | −42.76750 | 0.30000 | | |
| 16 | 223.65230 | 2.54500 | 1.99900 | 18.0 |
| 17 | −597.37760 | 0.01000 | 1.56732 | 42.8 |
| 18 | −597.37760 | 1.20000 | 1.64193 | 48.1 |
| 19 | 26.63510 | Variable | | |
| 20* | 395.20950 | 6.52110 | 1.51570 | 55.8 |
| 21* | −34.09530 | 12.07120 | | |
| 22 | −23.16360 | 1.20000 | 1.74373 | 24.5 |
| 23 | −52.81980 | 12.91230 | | |
| 24 | ∞ | 2.10000 | 1.51680 | 64.2 |
| 25 | ∞ | 1.00000 | | |
| Image plane | ∞ | | | |

TABLE 4B (Aspheric surface data)

$12^{th}$ surface

K = 0.00000E+00, A4 = −3.39428E−06, A6 = −8.85129E−11, A8 = −2.53310E−11, A10 = 2.40292E−14

$13^{th}$ surface

K = 0.00000E+00, A4 = 1.09393E−05, A6 = −1.30330E−08, A8 = 0.00000E+00, A10 = 0.00000E+00

$15^{th}$ surface

K = −1.42129E+00, A4 = 1.18141E−05, A6 = −2.64056E−08, A8 = 3.18637E−11, A10 = 0.00000E+00

$20^{th}$ surface

K = 0.00000E+00, A4 = 3.85717E−05, A6 = −4.07250E−08, A8 = 2.60220E−11, A10 = 0.00000E+00

$21^{st}$ surface

K = 0.00000E+00, A4 = 1.85614E−05, A6 = −1.72363E−08, A8 = 4.11325E−12, A10 = −3.11109E−14

TABLE 4C (Various types of data in infinity in-focus state and close-object in-focus state)

| | Infinity | Close-object |
|---|---|---|
| Focal length | 48.2490 | 43.4014 |
| F number | 1.86007 | 1.90207 |
| Angle of view | 24.1355 | 22.9886 |
| Image height | 20.5383 | 20.9011 |
| Total lens length | 101.0000 | 101.0000 |
| d0 | ∞ | 349.0010 |
| d13 | 1.8000 | 8.1183 |
| d19 | 11.2386 | 4.9203 |
| Entrance pupil position | 26.6030 | 26.6030 |
| Exit pupil position | −49.0174 | −47.0376 |

TABLE 4C-continued (Various types of data in infinity in-focus state and close-object in-focus state)

|  | Infinity | Close-object |
|---|---|---|
| Anterior principal point | 27.3627 | 24.4842 |
| Posterior principal point | 52.7544 | 51.9422 |

TABLE 4D (Data about single lenses)

| Lens | Start surface | Focal length |
|---|---|---|
| 1 | 1 | 58.5734 |
| 2 | 3 | −46.9589 |
| 3 | 5 | −18.3568 |
| 4 | 7 | 28.7412 |
| 5 | 10 | 48.5707 |
| 6 | 12 | 56.3824 |
| 7 | 14 | 153.6832 |
| 8 | 16 | 163.1438 |
| 9 | 18 | −39.6911 |
| 10 | 20 | 61.1800 |
| 11 | 22 | −56.4459 |

TABLE 4E (Data about lens groups in infinity in-focus state)

| Group | Start surface | Focal length | Lens configuration length | Anterior principal point | Posterior principal point |
|---|---|---|---|---|---|
| 1 | 1 | 37.35704 | 45.29570 | 38.62975 | 48.15623 |
| 2 | 14 | −82.25802 | 6.86100 | 5.31688 | 8.01403 |
| 3 | 20 | 484.09358 | 19.79230 | −97.79902 | −75.35954 |

TABLE 4F (Zoom powers of lens groups in infinity in-focus state and close-object in-focus state)

| Group | Start surface | Infinity | Close-object |
|---|---|---|---|
| 1 | 1 | 0.00000 | −0.10665 |
| 2 | 14 | 1.67336 | 1.59751 |
| 3 | 20 | 0.77184 | 0.77174 |

TABLE 4G (Data about sub-lens groups)

| Group | Start surface | Focal length | Lens configuration length |
|---|---|---|---|
| 1A | 1 | −60.46558 | 28.47639 |
| 1B | 10 | 27.48965 | 13.21128 |

(Fifth Example of Numerical Values)

Following is a fifth exemplary set of numerical values for the imaging optical system corresponding to the fifth embodiment shown in FIG. 9. Specifically, as the fifth example of numerical values for the imaging optical system, surface data is shown in Table 5A, aspheric surface data is shown in Table 5B, various types of data in the infinity in-focus state and close-object in-focus state are shown in Table 5C, data about single lenses is shown in Table 5D, data about lens groups in the infinity in-focus state is shown in Table 5E, zoom powers of lens groups in the infinity in-focus state and close-object in-focus state are shown in Table 5F, and data about sub-lens groups is shown in Table 5G.

TABLE 5A (Surface data)

| Surface No. | r | d | nd | Vd |
|---|---|---|---|---|
| 0 (object surface) | ∞ | Variable | | |
| 1 | 30.66690 | 5.91450 | 1.87383 | 28.2 |
| 2 | 89.32480 | 0.01000 | 1.56732 | 42.8 |
| 3 | 89.32480 | 1.20000 | 1.56476 | 44.3 |
| 4 | 18.20210 | 12.11990 | | |
| 5 | −24.35250 | 1.20000 | 1.63550 | 33.0 |
| 6 | 26.77550 | 0.01000 | 1.56732 | 42.8 |
| 7 | 26.77550 | 7.53000 | 1.61871 | 62.6 |
| 8 | −48.93580 | 0.73800 | | |
| 9 (aperture) | ∞ | 2.87000 | | |
| 10 | 44.13390 | 7.85270 | 1.59282 | 68.6 |
| 11 | −49.05890 | 0.30000 | | |
| 12* | 125.87800 | 4.61080 | 1.51570 | 55.8 |
| 13* | −52.79440 | Variable | | |
| 14* | −158.77940 | 4.02260 | 1.51607 | 56.3 |
| 15* | 53.80920 | Variable | | |
| 16* | −66.86380 | 5.00000 | 1.51570 | 55.8 |
| 17* | −32.48830 | Variable | | |
| 18 | −74.07130 | 3.60690 | 1.79788 | 47.0 |
| 19 | −38.64790 | 6.31040 | | |
| 20 | −24.65900 | 1.20000 | 1.61615 | 34.6 |
| 21 | −86.87210 | 12.90000 | | |
| 22 | ∞ | 2.10000 | 1.51680 | 64.2 |
| 23 | ∞ | 1.00000 | | |
| Image plane | ∞ | | | |

TABLE 5B (Aspheric surface data)

$12^{th}$ surface

K = 0.00000E+00, A4 = −6.37727E−06, A6 = −1.76312E−09, A8 = 3.35755E−11, A10 = −5.80543E−14

$13^{th}$ surface

K = 0.00000E+00, A4 = 1.00000E−05, A6 = 3.57664E−09, A8 = 0.00000E+00, A10 = 0.00000E+00

$14^{th}$ surface

K = 0.00000E+00, A4 = 4.63373E−05, A6 = −1.36197E−07, A8 = 2.81755E−10, A10 = −2.83756E−13

$15^{th}$ surface

K = −1.42129E+00, A4 = 5.75463E−05, A6 = −1.26605E−07, A8 = 2.08207E−10, A10 = 0.00000E+00

$16^{th}$ surface

K = 0.00000E+00, A4 = 4.02715E−05, A6 = −1.74585E−08, A8 = −6.66628E−11, A10 = 0.00000E+00

$17^{th}$ surface

K = 0.00000E+00, A4 = 2.94254E−05, A6 = −8.09409E−09, A8 = −2.80268E−11, A10 = −1.55405E−13

TABLE 5C (Various types of data in infinity in-focus state and close-object in-focus state)

|  | Infinity | Close-object |
|---|---|---|
| Focal length | 48.2513 | 43.8491 |
| F number | 1.86006 | 1.88829 |
| Angle of view | 24.1389 | 23.3778 |
| Image height | 21.0586 | 21.3409 |
| Total lens length | 100.9999 | 100.9999 |
| d0 | ∞ | 349.0010 |
| d13 | 1.8000 | 5.7339 |
| d15 | 15.2361 | 8.2902 |
| d17 | 3.4679 | 6.4799 |
| Entrance pupil position | 25.4248 | 25.4248 |
| Exit pupil position | −57.0352 | −54.1634 |
| Anterior principal point | 32.8540 | 29.6152 |
| Posterior principal point | 52.7460 | 51.4698 |

TABLE 5D (Data about single lenses)

| Lens | Start surface | Focal length |
|---|---|---|
| 1 | 1 | 51.0428 |
| 2 | 3 | −40.7262 |
| 3 | 5 | −19.8867 |
| 4 | 7 | 29.0767 |
| 5 | 10 | 40.4595 |
| 6 | 12 | 72.7634 |
| 7 | 14 | −77.3773 |
| 8 | 16 | 116.7600 |
| 9 | 18 | 96.9061 |
| 10 | 20 | −56.2981 |

TABLE 5E (Data about lens groups in infinity in-focus state)

| Group | Start surface | Focal length | Lens configuration length | Anterior principal point | Posterior principal point |
|---|---|---|---|---|---|
| 1 | 1 | 33.88451 | 44.35590 | 36.06746 | 45.70752 |
| 2 | 14 | −520.27206 | 24.25870 | 96.13860 | −145.07039 |
| 3 | 18 | −148.70233 | 11.11730 | −14.36699 | 4.97024 |

TABLE 5F (Zoom powers of lens groups in infinity in-focus state and close-object in-focus state)

| Group | Start surface | Infinity | Close-object |
|---|---|---|---|
| 1 | 1 | 0.00000 | −0.09649 |
| 2 | 14 | 1.33164 | 1.26898 |
| 3 | 18 | 1.06934 | 1.06978 |

TABLE 5G (Data about sub-lens groups)

| Group | Start surface | Focal length | Lens configuration length |
|---|---|---|---|
| 1A | 1 | −74.63936 | 27.98445 |
| 1B | 10 | 27.23843 | 12.76358 |
| 2A | 14 | −77.37733 | 4.02260 |
| 2B | 16 | 116.76002 | 5.00000 |

(Values Corresponding to Inequalities)

Values, corresponding to the Inequalities (1) to (12), of the respective examples of numerical values are shown in the following Table 6:

TABLE 6

| Condition | | 1st example of numerical values | 2nd example of numerical values | 3rd example of numerical values | 4th example of numerical values | 5th example of numerical values |
|---|---|---|---|---|---|---|
| L_STO/LL | (1) | 0.38 | 0.24 | 0.38 | 0.34 | 0.34 |
| LL/Y | (2) | 3.98 | 4.08 | 3.99 | 4.14 | 4.04 |
| TG3A/TL3E | (3) | 10.42 | 7.19 | 4.72 | 10.06 | 5.26 |
| |FL_L3E/FL| | (4) | 1.23 | 1.02 | 1.14 | 1.17 | 1.17 |
| q | (5) | 2.16 | 2.56 | 1.82 | 2.56 | 1.79 |
| TG3P/TG3M | (6) | 10.42 | 7.19 | 4.70 | 1.85 | 5.26 |
| TSTO/Y | (7) | 0.17 | 0.17 | 0.17 | 0.18 | 0.17 |
| |NdL1BE − NdL2F| | (8) | 0.00037 | 0.00037 | 0.00037 | 0.00000 | 0.00037 |
| BF/Y | (9) | 0.75 | 0.79 | 0.75 | 0.78 | 0.76 |
| TEOC_L3E/FL | (10) | 0.72 | 0.85 | 0.74 | 0.79 | 0.81 |
| TSTO_L3E/FL | (11) | 2.92 | 2.79 | 3.03 | 3.12 | 3.23 |
| FL_G1/FL_G1B | (12) | 0.77 | 0.70 | 0.79 | 0.74 | 0.80 |
| TG3/FL | (13) | 0.41 | 0.47 | 0.43 | 0.41 | 0.23 |

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

INDUSTRIAL APPLICABILITY

The imaging optical system according to the present disclosure is applicable to various types of cameras including digital still cameras, lens interchangeable digital cameras, digital camcorders, cameras for cellphones and smartphones, and cameras for personal digital assistants (PDAs), surveillance cameras for surveillance systems, Web cameras, and onboard cameras. Among other things, the present disclosure is particularly effectively applicable as an imaging optical system for digital still camera systems, digital camcorder systems, and other camera systems that require high image quality.

The invention claimed is:

1. An imaging optical system comprising:
a first lens group having positive power;
a second lens group having power; and
a third lens group having power,
the first lens group, the second lens group, and the third lens group being arranged in this order such that the first lens group is located closer to an object than any other lens group of the imaging optical system is,
the first lens group and the third lens group being configured not to move along an optical axis of the imaging optical system while the imaging optical system is focusing,
the second lens group including at least one lens LFN having negative power,
the at least one lens LFN being configured to move along the optical axis such that a first interval and a second interval change while the imaging optical system is focusing, the first interval being an interval on the optical axis between a surface, located closest to an image, of the first lens group and a surface, located closest to the object, of the second lens group, the second interval being an interval on the optical axis between a surface, located closest to the image, of the second lens group and a surface, located closest to the object, of the third lens group,
the first lens group including:
a sub-lens group G1A;
an aperture stop; and
a sub-lens group G1B,
the sub-lens group G1A, the aperture stop, and the sub-lens group G1B being arranged in this order such that the sub-lens group G1A is located closer to the object than any other component of the first lens group is,
the sub-lens group G1A including:
a lens L1A1; and
a lens L1A2 located adjacent to, and closer to the image than, the lens L1A1,
the lens L1A1 and the lens L1A2 being arranged in this order such that the lens L1A1 is located closer to the object than any other component, including the lens L1A2, of the sub-lens group G1A is,
an object-side surface of the lens L1A1 being convex toward the object,
the third lens group including:
a lens L3E having negative power; and
a lens L3P located adjacent to, and closer to the object than, the lens L3E,
the lens L3E and the lens L3P being arranged in this order such that the lens L3E is located closer to the image than any other component, including the lens L3P, of the third lens group is.

2. The imaging optical system of claim 1, wherein the lens L1A2 has negative power, an image-side surface of the lens L1A2 having a concave surface shape, and the imaging optical system satisfies the following inequalities (1), (2), and (3):

$$0.1 < L\_STO/LL < 0.6 \quad (1)$$

$$2.0 < LL/Y < 10.0 \quad (2)$$

$$0.1 < TG3A/TL3E < 20 \quad (3)$$

where L_STO is an interval on the optical axis between the object-side surface of the lens L1A1 and the aperture stop,
LL is an interval on the optical axis between the object-side surface of the lens L1A1 and an image-side surface of the lens L3E,
Y is an image height of the imaging optical system in an infinity in-focus state,
TG3A is a maximum value of an air gap on the optical axis within the third lens group, and
TL3E is a thickness on the optical axis of the lens L3E.

3. The imaging optical system of claim 1, wherein the lens L1A1 has positive power.

4. The imaging optical system of claim 1, wherein the imaging optical system satisfies the following Inequality (4):

$$|FL\_L3E/FL| < 7 \quad (4)$$

where FL_L3E is a focal length of the lens L3E, and
FL is a focal length of the entire imaging optical system.

5. The imaging optical system of claim 1, wherein an object-side surface of the lens L3E has a concave surface shape,
the imaging optical system satisfies the following Inequality (5):

$$-1 < q < 4.5 \quad (5)$$

where q is a shape factor of the lens L3E and is given by $$q = (RrL3E + RfL3E)/(RrL3E - RfL3E)$$

where RfL3E is a radius of curvature of the object-side surface of the lens L3E, and
RrL3E is a radius of curvature of an image-side surface of the lens L3E.

6. The imaging optical system of claim 1, wherein at least one of an image-side surface or an object-side surface is convex toward the aperture stop, the image-side surface being a surface of a lens located adjacent to, and closer to the object than, the aperture stop, the object-side surface being a surface of a lens located adjacent to, and closer to the image than, the aperture stop.

7. The imaging optical system of claim 1, wherein the imaging optical system satisfies the following Inequality (6):

$$0.25 < TG3P/TG3M < 20 \quad (6)$$

where TG3P is a sum of thicknesses on the optical axis of all positive lenses included in the third lens group, and TG3M is a sum of thicknesses on the optical axis of all negative lenses included in the third lens group.

8. The imaging optical system of claim 1, wherein the imaging optical system satisfies the following Inequality (7):

$$0.05 < TSTO/Y < 0.5 \qquad (7)$$

where TSTO is an interval on the optical axis between an image-side surface of a lens located adjacent to, and closer to the object than, the aperture stop and an object-side surface of a lens located adjacent to, and closer to the image than, the aperture stop, and Y is an image height of the imaging optical system in an infinity in-focus state.

9. The imaging optical system of claim 1, wherein the lens L3P has positive power.

10. The imaging optical system of claim 1, wherein an object-side surface of the lens L3E has a concave surface shape.

11. The imaging optical system of claim 1, wherein the sub-lens group G1B includes at least two lenses.

12. The imaging optical system of claim 1, wherein the sub-lens group G1B includes a lens L1BE having positive power, the lens L1BE being located closest to the image in the sub-lens group G1B.

13. The imaging optical system of claim 12, wherein the imaging optical system satisfies the following Inequality (8):

$$|NdL1BE - NdL2F| < 0.2 \qquad (8)$$

where NdL1BE is a d-line refractive index of the lens L1BE, and

NdL2F is a d-line refractive index of a lens L2F located closest to the object in the second lens group.

14. The imaging optical system of claim 3, wherein the imaging optical system satisfies the following Inequality (9):

$$0.3 < BF/Y < 3 \qquad (9)$$

where BF is an interval on the optical axis between an image-side surface of the lens L3E and an image plane, and Y is an image height of the imaging optical system in an infinity in-focus state.

15. The imaging optical system of claim 1, wherein the imaging optical system satisfies the following Inequality (10):

$$0.3 < TFOC\_L3E/FL < 3 \qquad (10)$$

where TFOC_L3E is an interval on the optical axis between an object-side surface of a lens L2F located closest to the object in the second lens group and an image-side surface of the lens L3E when the imaging optical system is in an infinity in-focus state, and FL is a focal length of the entire imaging optical system.

16. The imaging optical system of claim 1, wherein the imaging optical system satisfies the following inequality:

$$0.2 < FL\_G1B/FL\_GT < 5$$

where FL_G1B is a focal length of the sub-lens group G1B, and

FL_G1 is a focal length of the first lens group.

17. The imaging optical system of claim 1, wherein the imaging optical system satisfies the following inequality:

$$0.1 < TG3/FL < 2$$

where TG3 is an interval on the optical axis between a surface, located closest to the object, of the third lens group and a surface, located closest to the image, of the third lens group, and FL is a focal length of the entire imaging optical system.

18. The imaging optical system of claim 1, wherein while the imaging optical system is focusing to make a transition from an infinity in-focus state toward a close-object in-focus state, a surface, located closest to the object, of the second lens group moves toward the image.

19. A camera system comprising:
an interchangeable lens unit including the imaging optical system of claim 1; and
a camera body including: an image sensor configured to receive an optical image formed by the imaging optical system and transform the optical image into an electrical image signal; and a camera mount, the camera body being configured to be connected removably to the interchangeable lens unit via the camera mount,
the interchangeable lens unit forming the optical image of the object on the image sensor.

20. An image capture device configured to transform an optical image of an object into an electrical image signal and display and/or store the electrical image signal transformed, the image capture device comprising:
the imaging optical system of claim 1 configured to form the optical image of the object; and
an image sensor configured to transform the optical image formed by the imaging optical system into the electrical image signal.

* * * * *